US006529911B1

(12) United States Patent
Mielenhausen

(10) Patent No.: US 6,529,911 B1
(45) Date of Patent: Mar. 4, 2003

(54) DATA PROCESSING SYSTEM AND METHOD FOR ORGANIZING, ANALYZING, RECORDING, STORING AND REPORTING RESEARCH RESULTS

(76) Inventor: Thomas C. Mielenhausen, 1515 Osceola Ave., St. Paul, MN (US) 55105

( * ) Notice: Subject to any disclaimer, the term of this patent is extended or adjusted under 35 U.S.C. 154(b) by 0 days.

(21) Appl. No.: 09/085,998

(22) Filed: May 27, 1998

(51) Int. Cl.[7] .............................................. G06F 17/30
(52) U.S. Cl. ...................................................... 707/100
(58) Field of Search ................................ 707/100, 102, 707/200

(56) References Cited

U.S. PATENT DOCUMENTS

| | | | | | |
|---|---|---|---|---|---|
| 4,700,318 | A | * | 10/1987 | Ockman | 395/131 |
| 5,157,783 | A | * | 10/1992 | Anderson et al. | 707/4 |
| 5,233,513 | A | * | 8/1993 | Doyle | 705/7 |
| 5,444,615 | A | | 8/1995 | Bennett | 705/8 |
| 5,655,118 | A | * | 8/1997 | Heindel et al. | 707/103 |
| 5,706,452 | A | | 1/1998 | Ivanov | 345/331 |
| 5,802,518 | A | * | 9/1998 | Karaev et al. | 707/9 |
| 5,893,074 | A | * | 4/1999 | Hughes et al. | 705/8 |
| 5,974,413 | A | * | 10/1999 | Beauregard et al. | 707/6 |
| 6,023,572 | A | * | 2/2000 | Lautzenheiser et al. | 395/500.23 |
| 6,023,702 | A | * | 2/2000 | Leisten et al. | 707/100 |
| 6,041,303 | A | * | 3/2000 | Matthews | 705/1 |
| 6,067,548 | A | * | 5/2000 | Cheng | 707/103 |
| 6,091,893 | A | * | 7/2000 | Fintel et al. | 395/500.27 |
| 6,125,383 | A | * | 9/2000 | Glynias et al. | 709/202 |

OTHER PUBLICATIONS

Gedeon et al., Information Retrieval in Law Using Neural Network Integrated with Hypertext, IEEE International Joint Conference on Neural Networks, Nov. 1991, vol. 2, pp. 1819–1824.

Gosh– Roy et al., On–Line Legal Aid: Markov Chain Model for Efficient Retrieval of Legal Documents, IEEE Colloquium on Document Image Processing and Multimedia Environments, Nov. 1995, vol. XX, No. Y, pp. 15/1–15/7.

Elliot, Moving from paper–based to digital documents: Case Study of Public Defenders Using Case Management and Legal Research, Proceedings of the Thirtieth Hawaii International Conference on System Sciences, Jan. 1997, vol. 6, pp. 97–106.

Stanfield, Cyber Courts: Using the Internet to Assist Court Processes, Computer Networks and ISDN Systems, Apr. 1998, vol. 30, Issue 1–7, pp. 559–566.

* cited by examiner

*Primary Examiner*—Maria N. Von Buhr
(74) *Attorney, Agent, or Firm*—Nelson R. Capes; Briggs and Morgan, P.A.

(57) ABSTRACT

A data processing system for and method for organizing, analyzing, recording, storing, and reporting research results. The data processing system defines structural and functional relationships between separate data structures for research projects, propositions related to each research project, and authorities related to the research projects. The data processing method defines a sequence of process steps in which the user's identification, information related to each research project, information related to each proposition, and information related to each authority are input, and reports displaying the information associated with each proposition and the information associated with each authority are output.

82 Claims, 28 Drawing Sheets

DATA PROCESSING SYSTEM AND METHOD FOR ORGANIZING, ANALYZING, RECORDING, STORING AND REPORTING RESEARCH RESULTS

BACKGROUND OF THE INVENTION

Legal research has become increasingly automated over the past decade, due to advances in personal computer technology. There has been a significant increase in the number of on-line and CD-ROM research databases, and World Wide Web resources, available to help the legal researcher find authorities and other data related to a research project. With all of these developments, however, there remains a need for an efficient and uniform means of organizing, analyzing and storing the wealth of data that might be gathered in connection with a legal research project. This data processing system and method, a software application developed by a practicing attorney, fulfills that need. Whereas on-line and CD-ROM research databases help the researcher find authorities and other data, the data processing system and method helps the researcher organize, analyze and store that data in a manner that is useful to the researcher, and to others who may want to review or use the data currently or in the future.

Current technology does not adequately help the legal researcher organize, analyze and store legal research in an effective manner. In the usual research project, the researcher generates hard copies of notes, authorities, memoranda and other materials, and stores those materials in file folders. The researcher can also download authorities and other data from on-line or CD-ROM databases, and store that data and other research materials in word processing documents. In either case, however, there is no uniform and integrated method for thoroughly recording the various propositions related to a project, the research avenues, leads and ideas that have been and remain to be pursued, the authorities that have been and remain to be located and reviewed, the analysis of those authorities and other tasks that have been and remain to be completed, and other information that is essential to effective legal research.

If any method is used for recording and organizing that information, it typically varies from researcher to researcher, and even from project to project worked upon by the same researcher. If miscellaneous notes and other research project data have been stored in various file folders or word processing documents, the data may be difficult to locate and understand, even assuming that materials have not been taken out of the files over time for other projects.

As a result of the above situation, the researcher—and any person who must supervise, use or rely on the researcher's work—cannot be assured that the research and analysis in a particular project is complete, and is likely to miss relevant points and authorities. Moreover, the above method of recording and organizing data does not enable the researcher and others to create a tailored report of research data and analysis at the touch of a button. The data processing system and method of the present invention thus provides significant new capabilities not found in existing technology.

The data processing system and method of this patent application may also be used to assist researchers in other fields, such as medicine and journalism. Thus, while the specification particularly addresses application to legal research, it should not be viewed as limiting the claims to that application.

SUMMARY OF THE INVENTION

A data processing system for organizing, analyzing, recording, storing, and reporting research results consists of: a computer having a memory, a central processing unit, and an input/output unit, a first data structure recorded in the memory, the first data structure encoding a number of projects, a second data structure recorded in the memory, the second data structure encoding a number of propositions, a third data structure recorded in the memory, the third data structure encoding a number of authorities, and each of the propositions and authorities being associated with at least one of the projects, and a computer program executing in the central processing unit, the computer program defining structural and functional relationships among the projects, propositions, and authorities, the computer program receiving information on the projects, propositions, and authorities from an operator through the input/output unit, and the computer program organizing the information and displaying relationships among the projects, propositions, authorities and information to the operator through the input/output unit. A data processing method for organizing, analyzing, recording, storing, and reporting research results, comprising the steps of:

- inputting user identification data,
- inputting information related to a plurality of research projects,
- inputting information related to a plurality of propositions,
- associating each of the propositions with at least one of the research projects,
- inputting information on a plurality of authorities,
- associating each of the authorities with at least one of said plurality of research projects,
- outputting a propositions report displaying the information associated with selected propositions, and
- outputting an authorities report displaying the information associated with selected authorities.

A principal object and advantage of the data processing system and method is that it is designed for anyone who does legal research, or who supervises or reviews the legal research of others. The potential users include attorneys, judges, law professors, law clerks, law students, paralegals, and law librarians.

Another principal object and advantage of the data processing system and method is that it is designed for use on a local area network, as well as a stand-alone computer, so that courts, law firms, corporate and governmental legal departments, universities, libraries, and other organizations can save and access their employees' legal research indefinitely, electronically and in one place.

Through the data processing system and method, an organization or single user can avoid expensive and inefficient duplication of research on propositions that have been researched in the past. Further, over time, the data processing system and method enables the organization or single user to return to, reconsider, build upon and improve the research and analysis of a recurring proposition, particularly when faced with new factual contexts.

The data processing system and method helps the user improve the quality of research project results, including the analysis and reporting of those results. Typically, a research project involves several propositions that must be researched and analyzed. The researcher's task is to search thoroughly for authorities relating to each proposition, to analyze each located authority for useful information relating to the proposition, and to develop additional ideas and find additional authorities based on that analysis. To be effective, the researcher must record and organize all of the above information in a manner that enables the researcher to keep track of the avenues that have been exhausted, the authorities that have been located and reviewed, the analysis of those authorities, the leads and ideas that have not yet been pursued, tasks that remain to be completed, and creative thoughts relating to the research project and its propositions.

By being organized, methodical and thorough, and recording everything done, the researcher is less likely to overlook relevant points and authorities, and more likely to develop a complete and compelling analysis of a proposition. Moreover, the researcher's supervisor, or a person who must use or rely on the research and analysis, can readily examine the organized data and be assured that the research and analysis is thorough and complete.

The features of the data processing system and method will result in much better legal research results and analysis and more creativity. It will help courts and advocates develop a more considered and improved body of law.

The data processing system and method helps the user accomplish the above prerequisites for effective legal research. For each proposition researched, the user can create, edit and view a record of each search conducted in each database or other resource, including a search of the data processing system and method itself for related data in other projects previously entered by the user or others in the user's organization. The user can create, edit and view a record of the citations or other results obtained from the search, the status of review of the results, and the authorities relating to the proposition.

For each authority, the user can create, edit and view a record of the authority's similar or contrary proposition; the authority's rationale for its proposition; the authority's relevant facts; the project's similar or contrary facts; the authority's persuasion factors; the authority's relevant quotations; other relevant authorities cited by the authority; and other analysis and data relating to the authority.

Through the data processing system and method, the user can also create, edit and view a record of ideas and prose relating to the project or a particular proposition, and a record of project tasks completed and remaining, including the priority of each task and any proposition to which it relates.

The user can also have the data processing system and method automatically create a report of all or part of the above data, for one or more propositions or authorities, which can then be used to prepare a memorandum or other written product relating to the research project.

Another object and advantage of the data processing system and method is that it gives each user the capability to maintain notes, ideas, and other prose in a separate "user notebook".

Another object and advantage of the data processing system and method is that it keeps track of the last dates on which project data was edited or searched. This provides an audit trail which the user can use to keep track of the flow of the project.

Another object and advantage of the data processing system and method is that it is preferably a windows-oriented program. The user can easily navigate through the program, and view, add, edit and delete data, via windows and buttons. A side button-bar, which is always accessible, enables the user to open the data processing system and method's main windows: the Projects Window, the Project's Proposition Window, the Authorities Window, the Ideas/Prose Window, the Tasks Window, the Reports Window, and the User Notebook Window.

Each of those windows contains a list with one entry at a time highlighted, and buttons that open data-entry windows. The data entered or edited in those windows is tied to the highlighted entry in the main window, or a combination of highlighted entries in certain main windows. That feature enables the data processing system and method to automatically organize and display all or part of the data on one or more projects, propositions or authorities.

DETAILED DESCRIPTION OF THE PREFERRED EMBODIMENTS

The data processing system and method for organizing research is illustrated in the attached block diagrams (FIGS. 1, 2, and 3), which are explained in detail below. For purposes of this Detailed Description, the data processing system and method shall be known as Legal Research Organizer or LRO.

Figure 1:
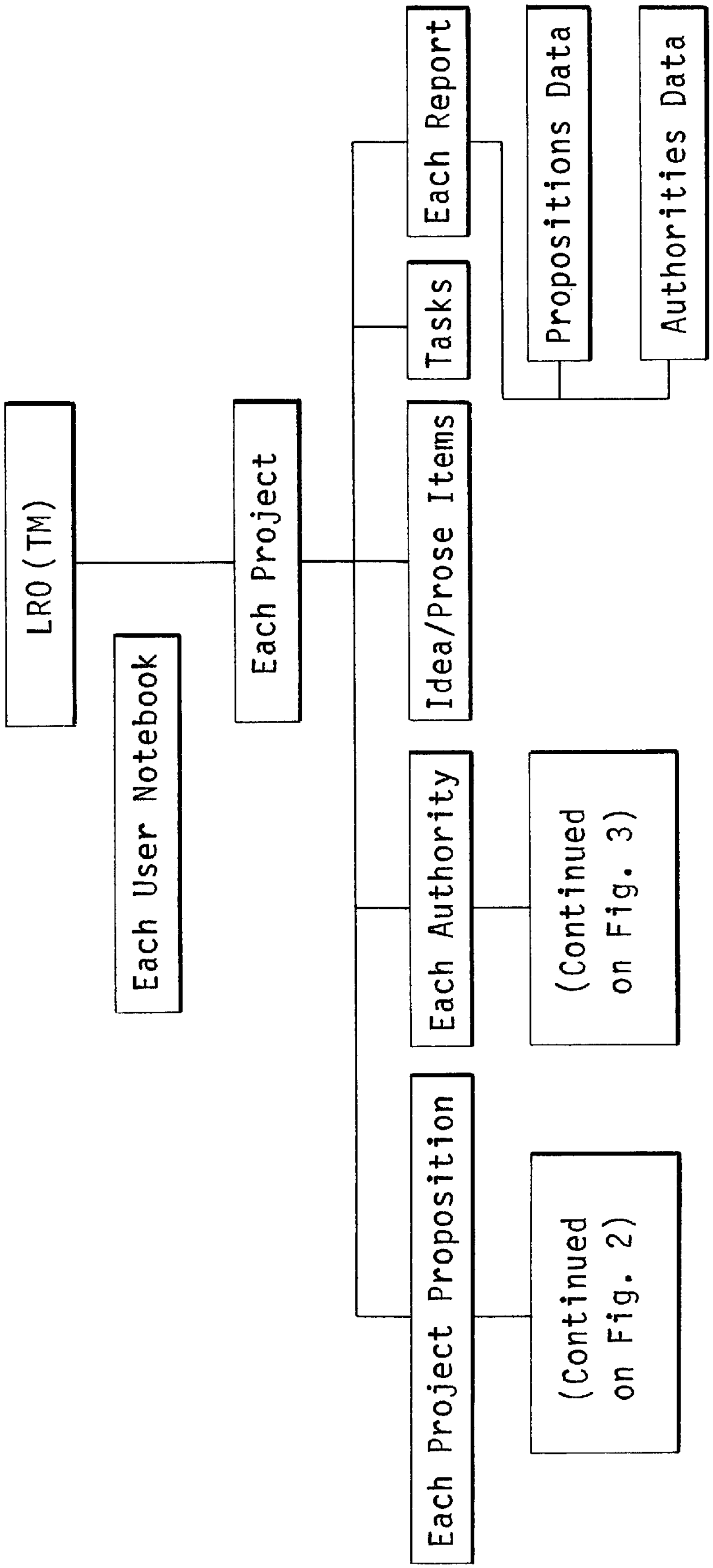
FIG. 1 is a block diagram of the data structures created by the data processing system.
Figure 2:
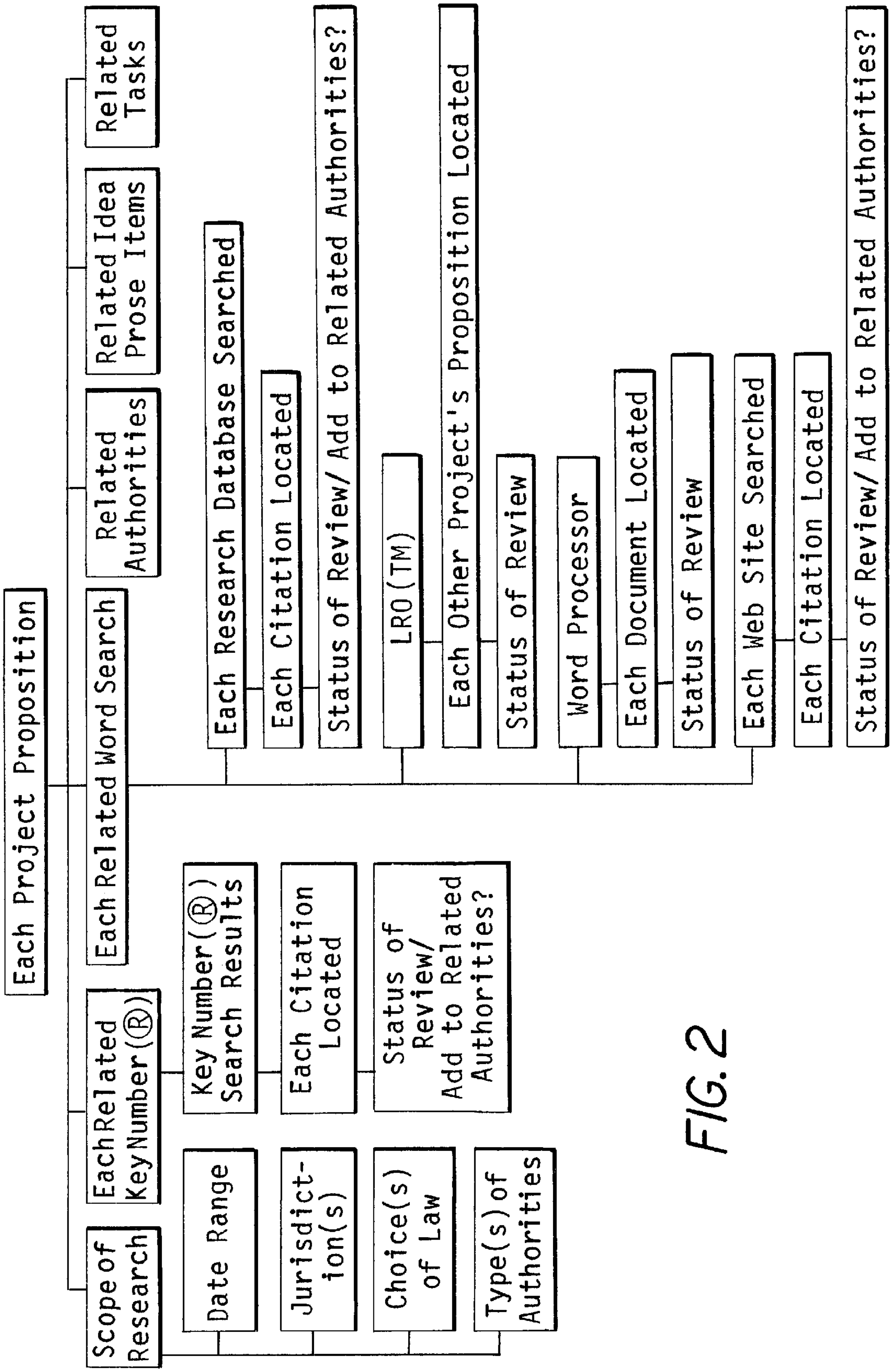
FIG. 2 is a continuation block diagram of FIG. 1.
Figure 3:
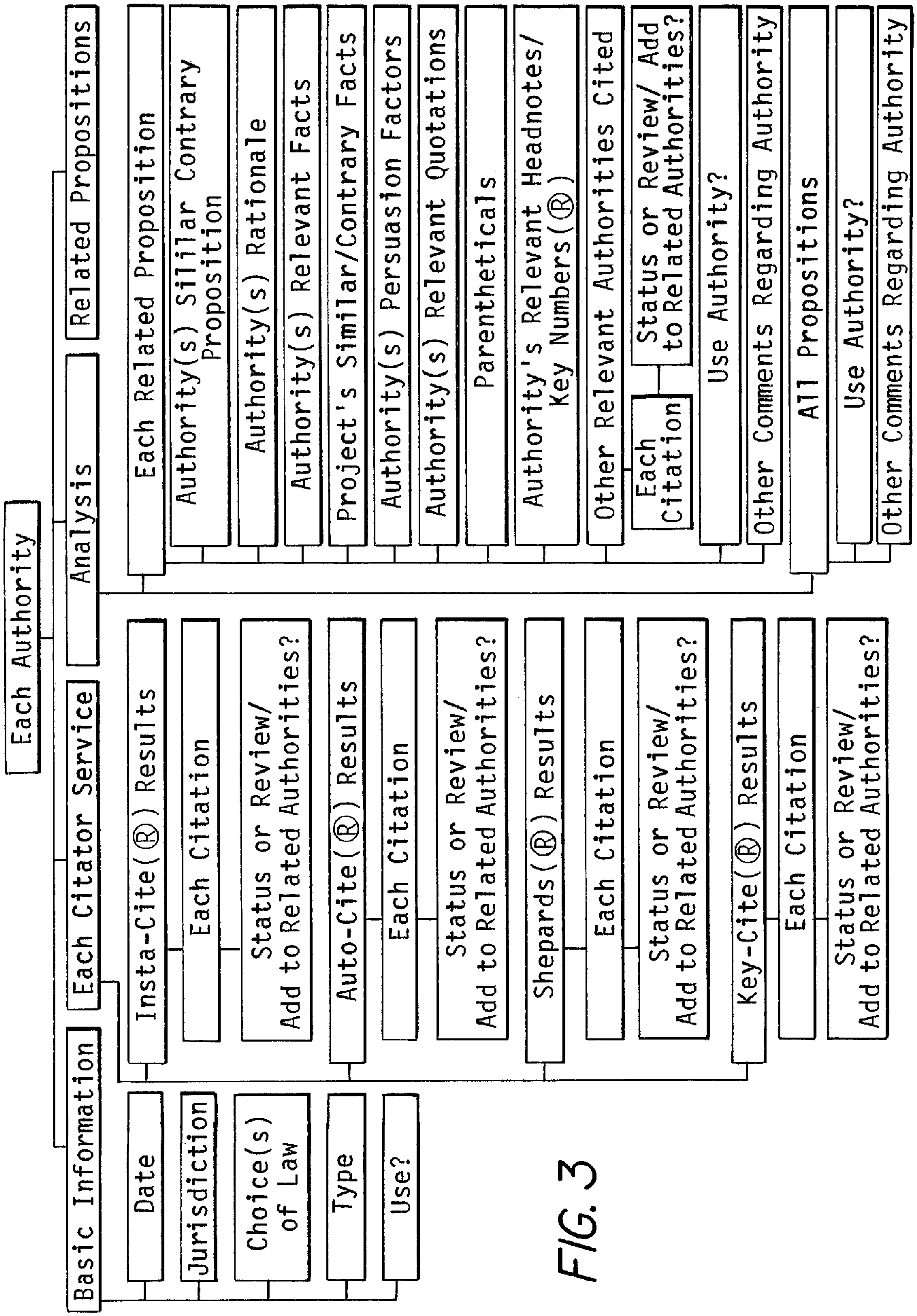
FIG. 3 is a continuation block diagram of FIG. 2.
Figure 4A:
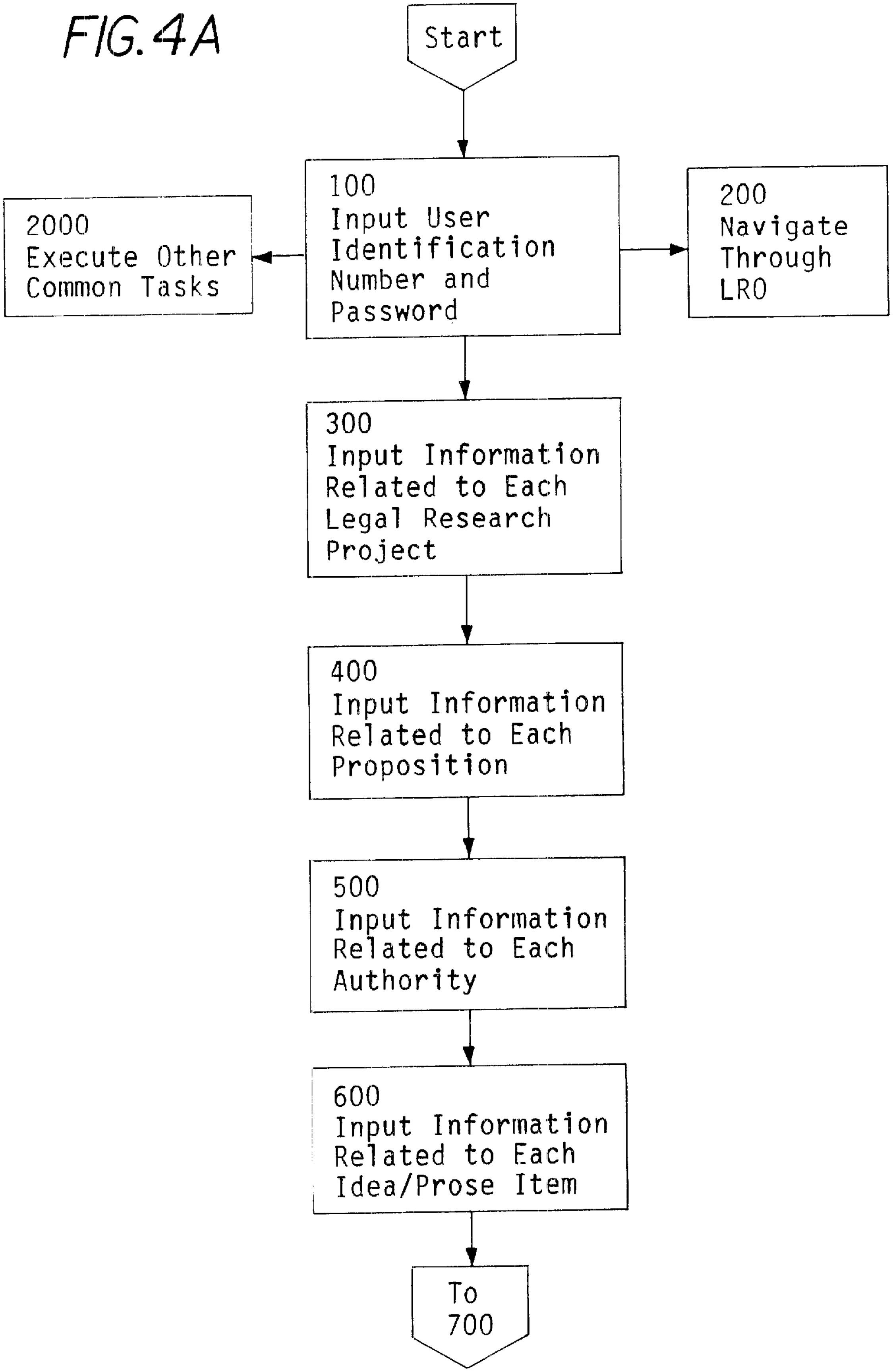
FIGS. 4A–4E are flowcharts of the data processing method.
Figure 4B:
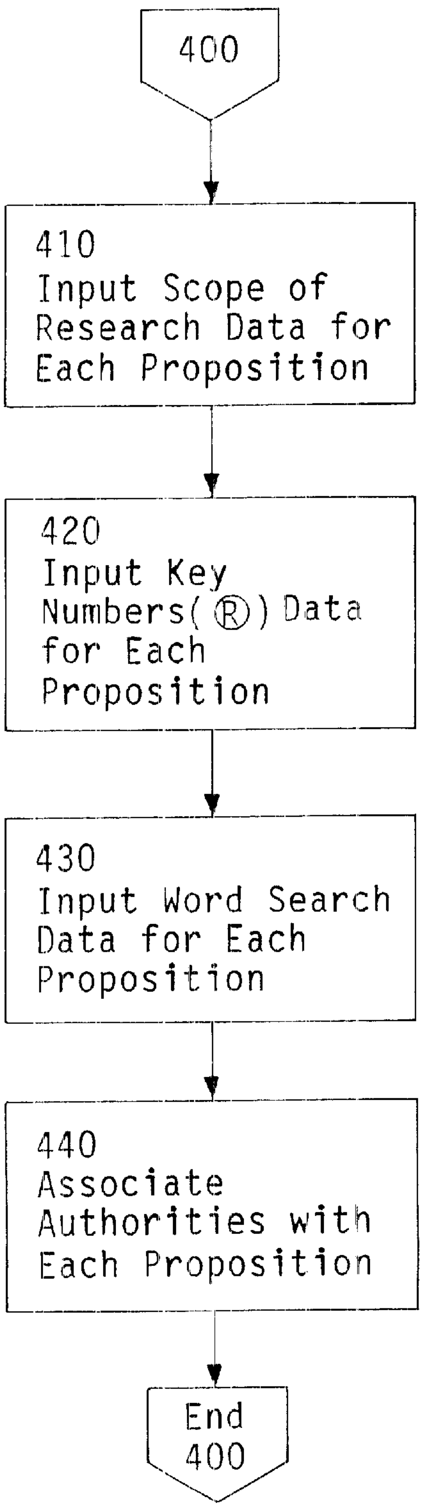
Figure 4C:
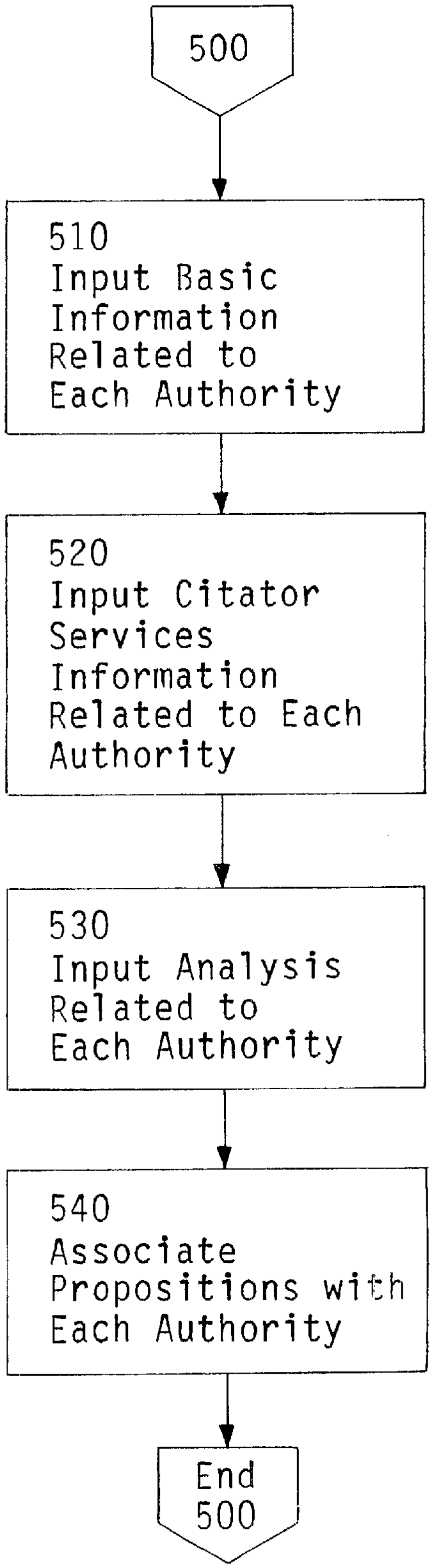
Figure 4D:
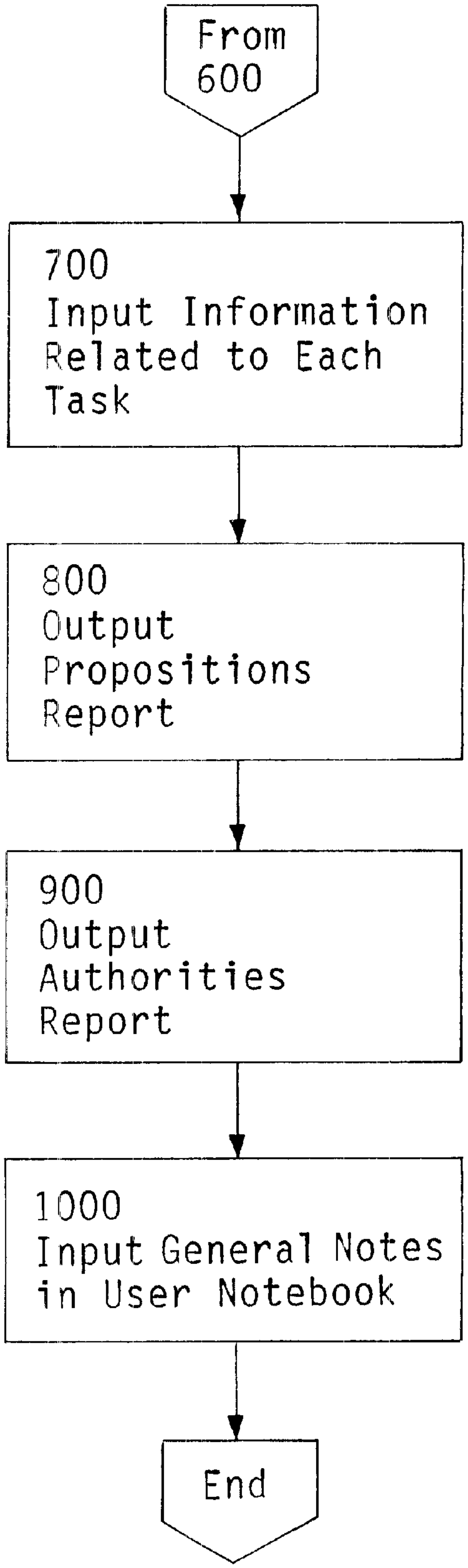
Figure 4E:
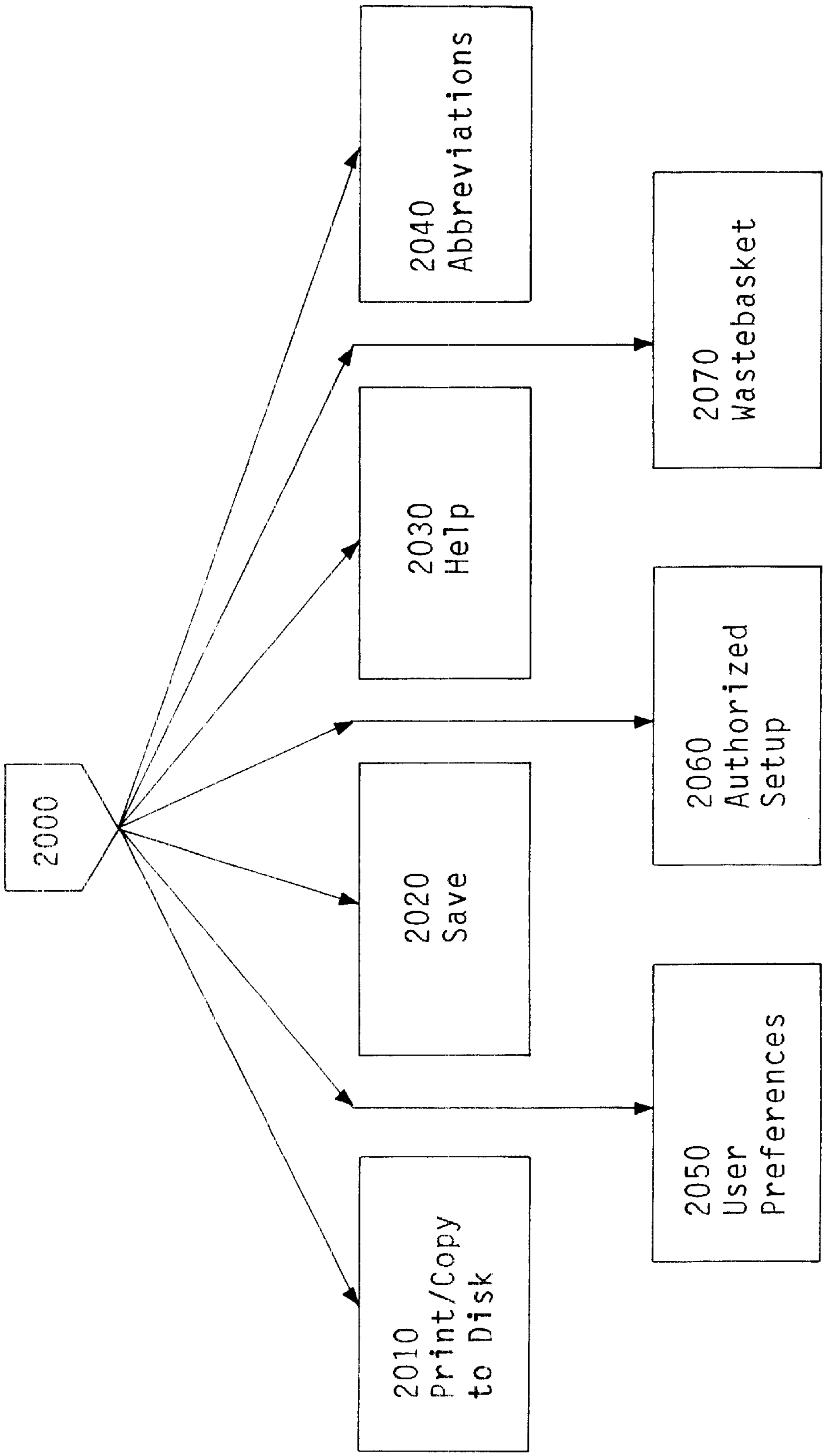

Furthermore, it will be understood by one of ordinary skill in the art that FIGS. 1, 2, and 3 also serve as a pictorial description of the data structures created by the system in order to carry out the described data processing.

A flowchart of the data processing method of the present invention is presented in FIGS. 4A–4E. It should be understood that the order of execution of these steps is not critical, except that Step 100 must be executed before any data may be entered.

Actual windows for the system's major features are shown in the Figures. For reasons for economy, not all windows are shown.

Step 100: Input User Identification Number and Password

Figure 5:
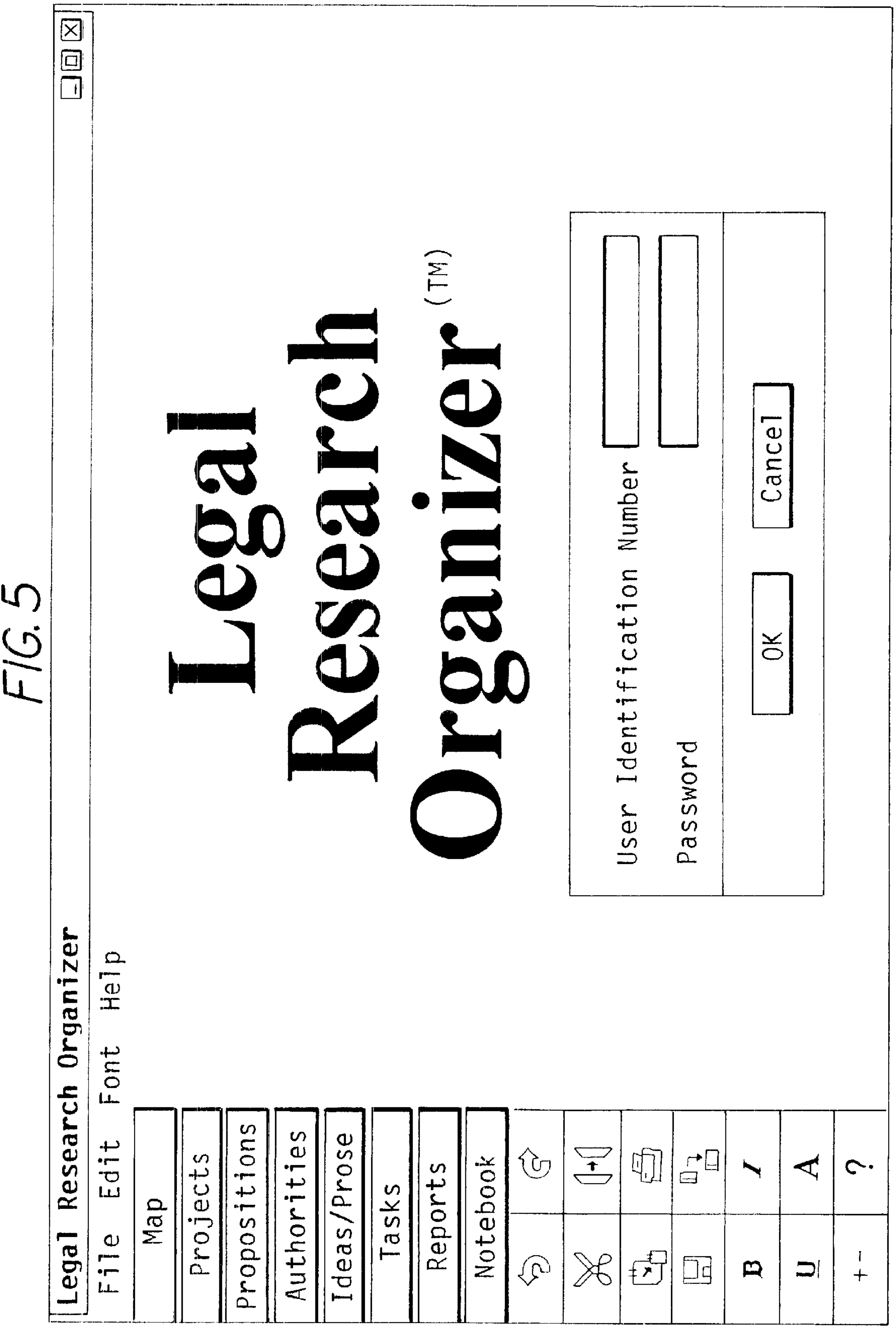
FIG. 5 is a schematic of a user identification and password window.
Figure 25:
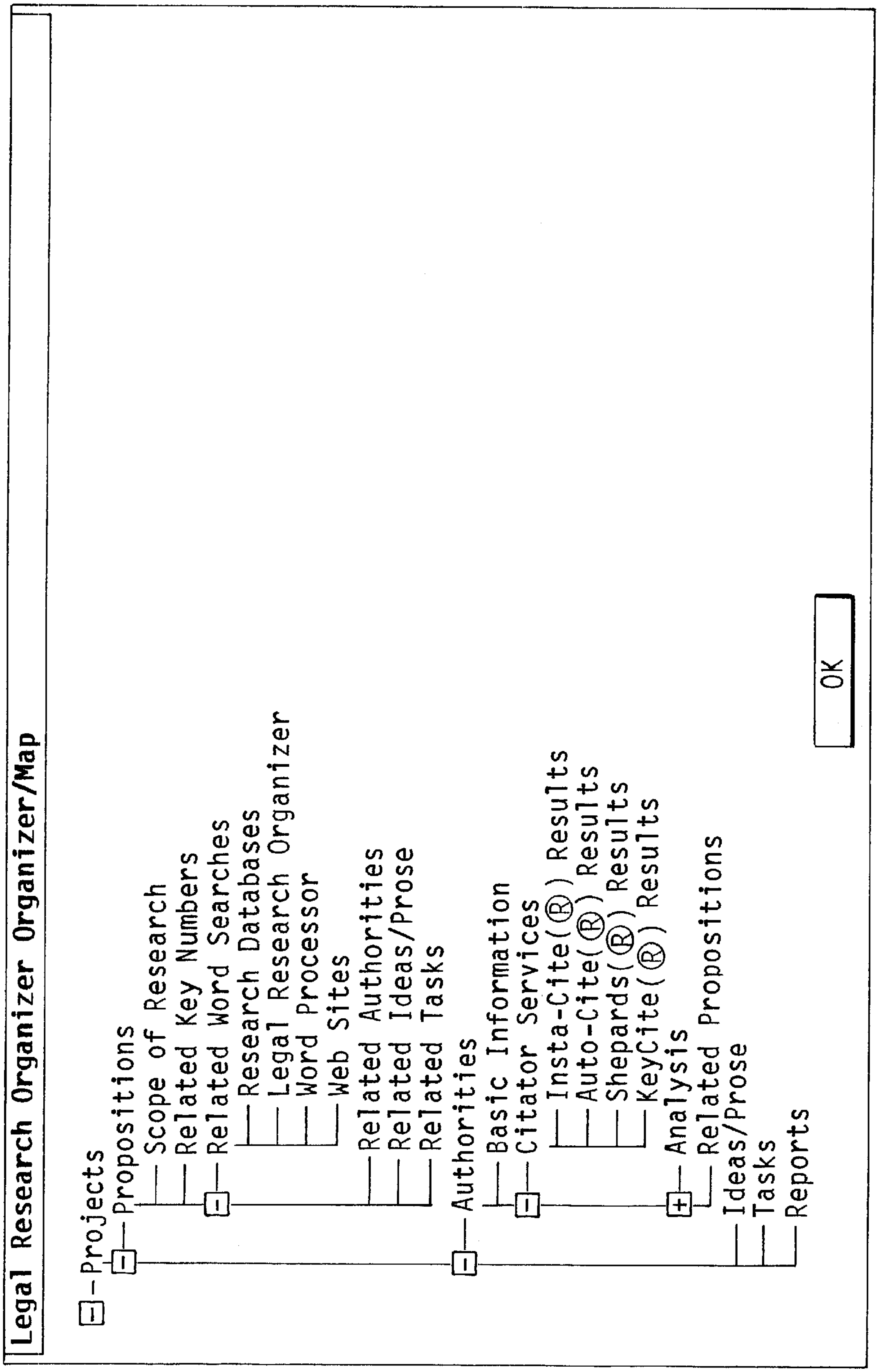
FIG. 25 is a schematic of a map window.

LRO opens with the User Identification Number and Password Window (FIG. 5). As a security measure, the user can proceed further only if LRO recognizes the combination of the user identification number and password entered in that window. If recognized, LRO opens the Map Window (FIG. 25) User identification numbers and passwords are pre-set by the computer or network administrator.

Step 200: Navigate Through LRO

Through LRO's Map Window (FIG. 25), the user can view a flow chart depicting the main components of LRO. The Map Window is a visual navigation tool which provides the user with a clear overview of the entire LRO program, allows the user to navigate easily through the program, and enables the user to determine the user's location in the program at any time. LRO's side button-bar, which is always accessible, includes a button which opens the Map Window. In addition to using the Map Window, the user can also navigate through LRO via the side button-bar, which opens LRO's main windows.

Step 300: Input Information Related to Each Legal Research Project

Figure 6:
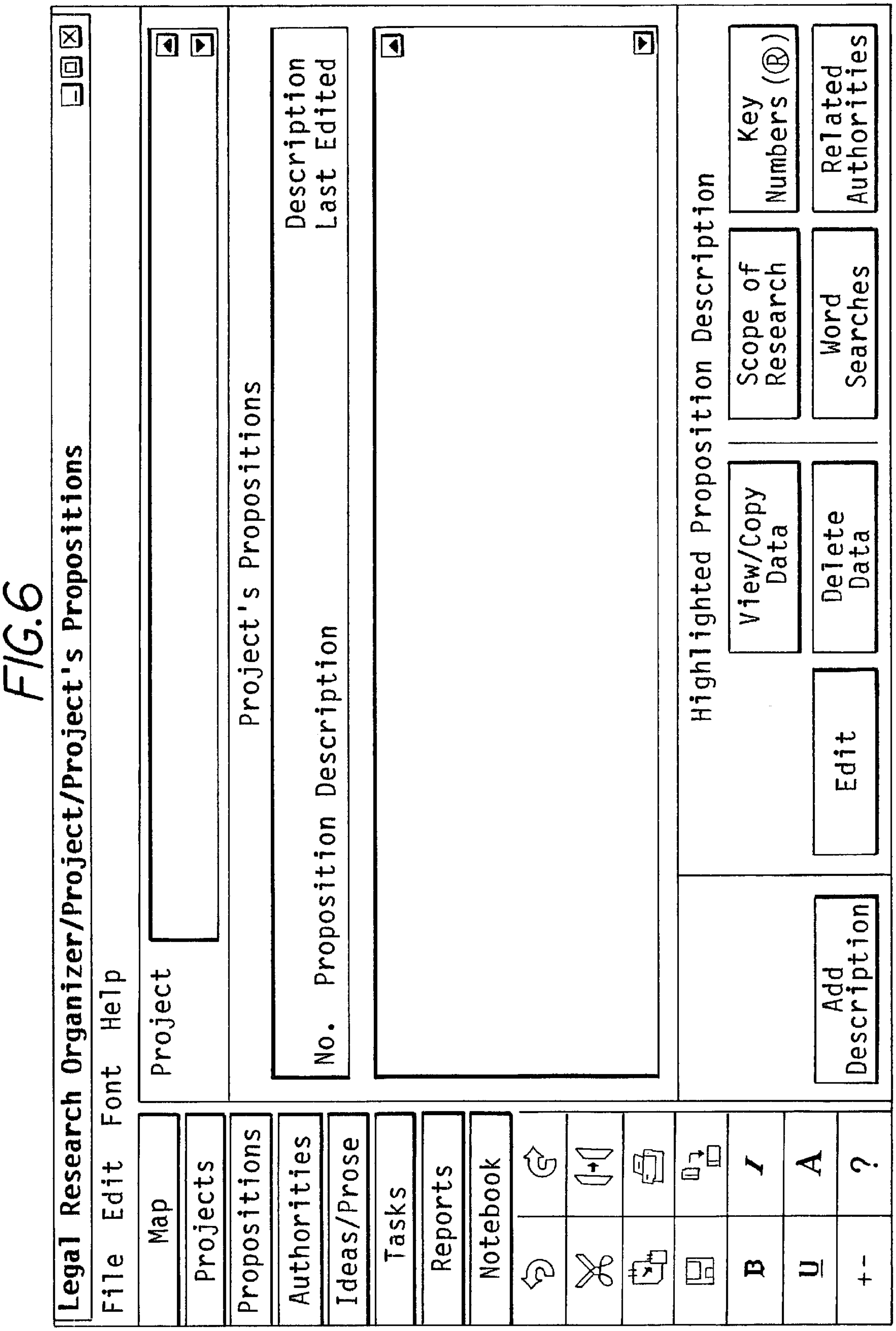
FIG. 6 is a schematic of a projects window.

Through LRO's Projects Window (FIG. 6), the user can view, add and edit descriptions of the research projects tied to the user's or network's LRO license number. Each description includes the project number (e.g., "98-100532"), the project name, the client name and number, the matter name and number, the case name and court file number, the date the project description was last edited, and each user who has entered or edited project data. LRO automatically assigns a non-reusable project number when a user adds a project name, and logs the last-edited date and users. LRO lists the project descriptions in descending order, by project number. The user can view the entire list of projects tied to the user's or network's LRO license number, or a list limited by one or more of the following: project number(s), user identification number(s), a project description word search, and a proposition description word search. Only one project description at a time is highlighted. The user can move the highlighting and the list by typing the digits of a project number.

(a) Through LRO's View/Copy Project Data Window, the user can view all data tied to the project description highlighted in the Projects Window. LRO displays the data in the Propositions Report format (explained in Step 800, below), outlining all data on all propositions tied to the highlighted project. All or part of the report can be copied, pasted, printed, or copied to floppy disk.

(b) Through LRO's Transfer Project Data Window, all data tied to the project description highlighted in the Projects Window can be transferred to or from another LRO program on an off-network computer (e.g., a laptop), via floppy disk or modem. The transferred data is not in the Propositions Report format described above. Instead, the data is in a format that enables a receiving LRO program to automatically sort the data to the pertinent or new windows in an existing or new project. The transfer procedures are designed to avoid any loss of changes to the data while it is checked-out. LRO's Transfer Project Data feature enhances the portability and sharing of research project data among LRO licensees. Moreover, LRO's inventor anticipates that a market will emerge for disks containing thorough and up-to-date LRO data on particular propositions, which the purchaser can then tailor and develop, using the LRO program, to suit the requirements of a particular research project.

(c) Through LRO's View Activities Window, the user can view each principal activity that has been performed in connection with the project highlighted in the Projects Window, the date of the activity, and the user who performed it. LRO automatically logs that information when a principal activity is performed. The View Activities feature enables the user to quickly view the main activities that have been performed on a project, or to identify the person who can answer any questions relating to a particular activity.

(d) Through LRO's Delete All Project Data Window, the user can delete all data on the project description highlighted in the Projects Window. The deleted data is stored in the LRO Wastebasket for a pre-defined period. (See Step 2070, below.) After the data is deleted from the Wastebasket, only the project description (with the word "—DELETED" after the pro ject name) remains in LRO.

Step 400: Input Information Related to Each Proposition

Figure 7:
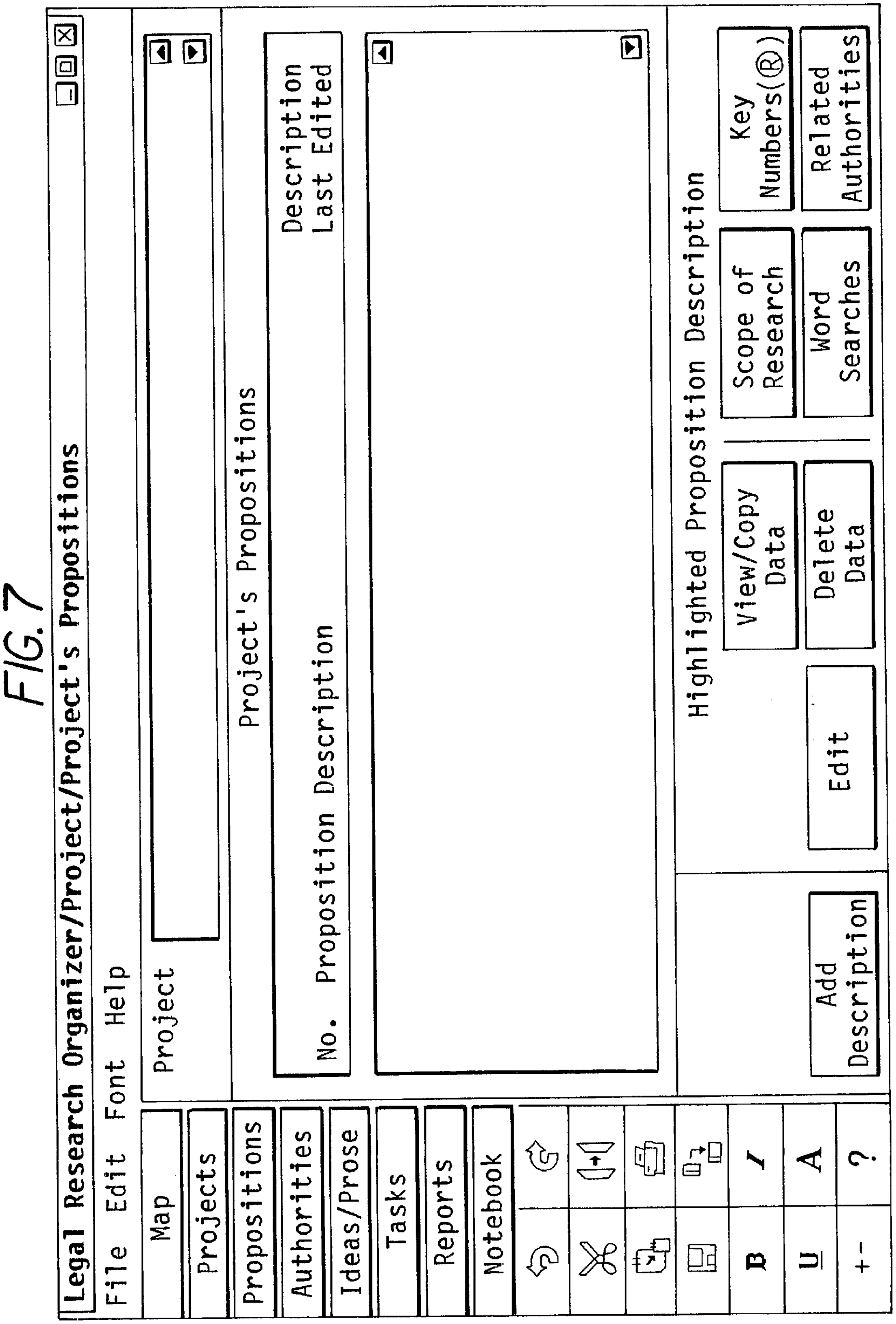
FIG. 7 is a schematic of a project's propositions window.

Through LRO's Project's Propositions Window (FIG. 7), the user can view, add and edit descriptions of the propositions tied to the project highlighted in the Projects Window. Each description includes the proposition number, the proposition, and the date the description was last edited. LRO automatically logs the last-edited date. LRO lists the descriptions in ascending order, by proposition number (which is assigned by the user). Only one proposition description at a time is highlighted.

(a) Through LRO's View/Copy Proposition Data Window, the user can view all data tied to the proposition description highlighted in the Project's Propositions Window. LRO displays the data in the Propositions Report format (explained in Step 800, below), outlining all data on the highlighted proposition. All or part of the report can be copied, pasted, printed, or copied to floppy disk.

(b) Through LRO's Delete All Proposition Data Window, the user can delete all data on the proposition description highlighted in the Project's Propositions Window. The deleted data is stored in the Wastebasket for a pre-defined period. See Step 2070, below.)

Step 410: Input Scope of Research for Each Proposition

Figure 8:
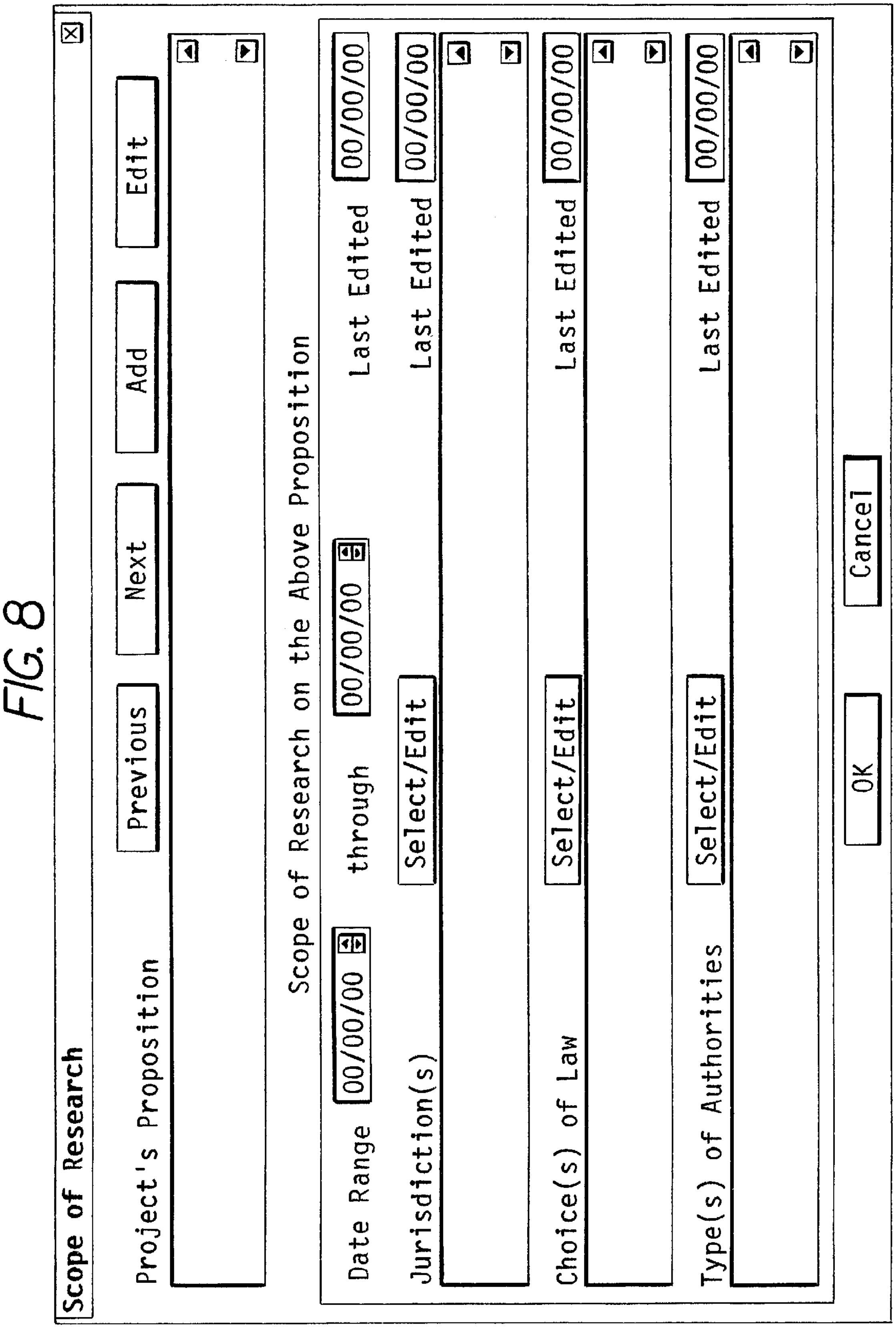
FIG. 8 is a schematic of a scope of research window.

The scope of research on a particular proposition sometimes must be limited, in order to reduce expense or otherwise meet the requirements of a research project. LRO's Scope of Research feature helps the researcher stay within the pre-defined parameters of a research project, and alerts others that the research data and analysis is limited to those parameters. Through LRO's Scope of Research Window (FIG. 8), the user can view, add and edit data showing the scope of research relating to the proposition highlighted in the Project's Propositions Window. The user can define the scope of authorities to be researched by date range, and by one or more of the following selected from a pre-set list: jurisdiction(s), choice(s) of law, and type(s) of authorities. If the user chooses, LRO notifies the user if entered data exceeds the scope of research for the proposition to which the data is related.

Step 420: Input Kev Number® Data for Each Proposition

West Publishing Corporation's Key Number® system is a useful tool for finding authorities relating to a proposition.

Figure 9:
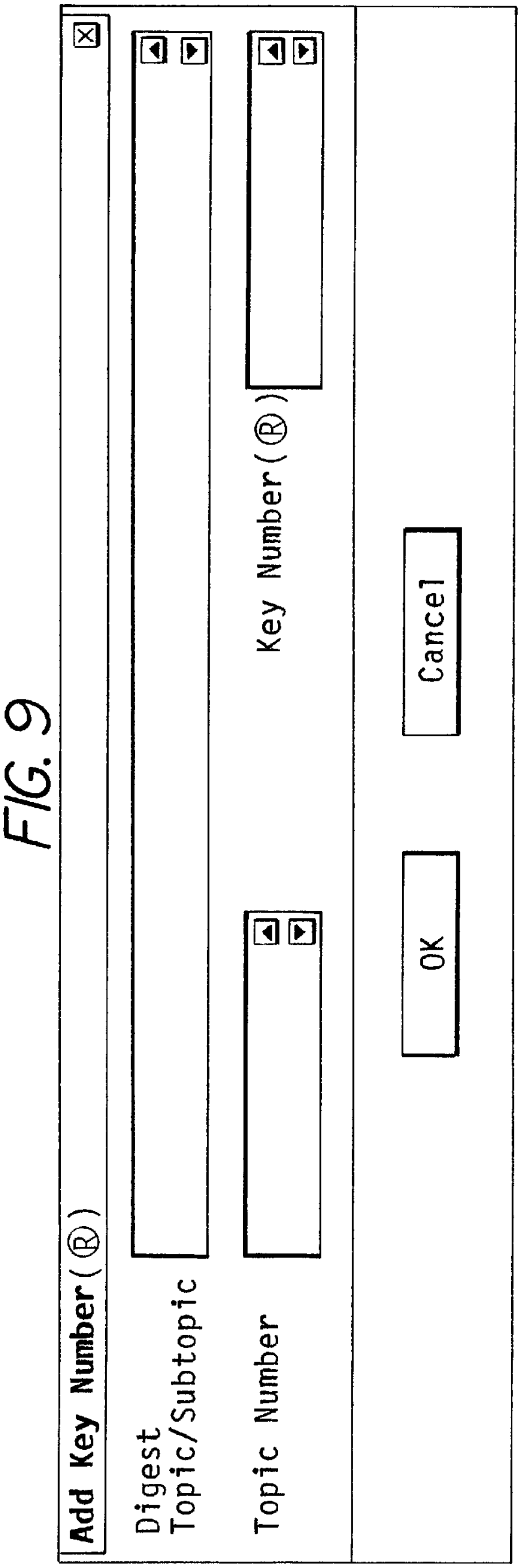
FIG. 9 is a schematic of a Key Numbers® window.

Through LRO's Key Numbers® Window (FIG. 9), the user can view, add and edit Key Number® descriptions tied to the proposition description highlighted in the Project's Propositions Window. Each description includes the Key Number® Digest topic/subtopic, topic number and Key Number®, and the date the Key Number® was last searched. LRO lists the descriptions in ascending order, by topic number and Key Number®. Only one description at a time is highlighted.

(a) Through LRO's Key Number® Search Results Window, the user can view, add, edit and delete citations and related data resulting from a search under the Key Number® highlighted in the Key Numbers® Window. After performing the word search via a book, or a CD-ROM or on-line research database, the user can enter, organize and analyze the results in LRO. The Key Number® Search Results Window shows the jurisdictions searched, a list of citations, and other related data entered/edited by the user. Each citation is accompanied by data showing the status of its review and the date the status was last updated. LRO orders the list of citations alphabetically. Only one citation at a time is highlighted.

(b) Through LRO's Paste/View Key Number® Database Cite List Window, the user can paste a list of citations, downloaded from an on-line or CD-ROM research database, for the Key Number® highlighted in the Key Numbers® Window. The user can then add one or more of those citations to the Key Number Search Results Window, along with data showing the status of the user's review of each citation. The Cite List Window indicates the date each list relating to the Key Number® was pasted.

Step 430: Input Word Search Data for Each Proposition

Figure 10:
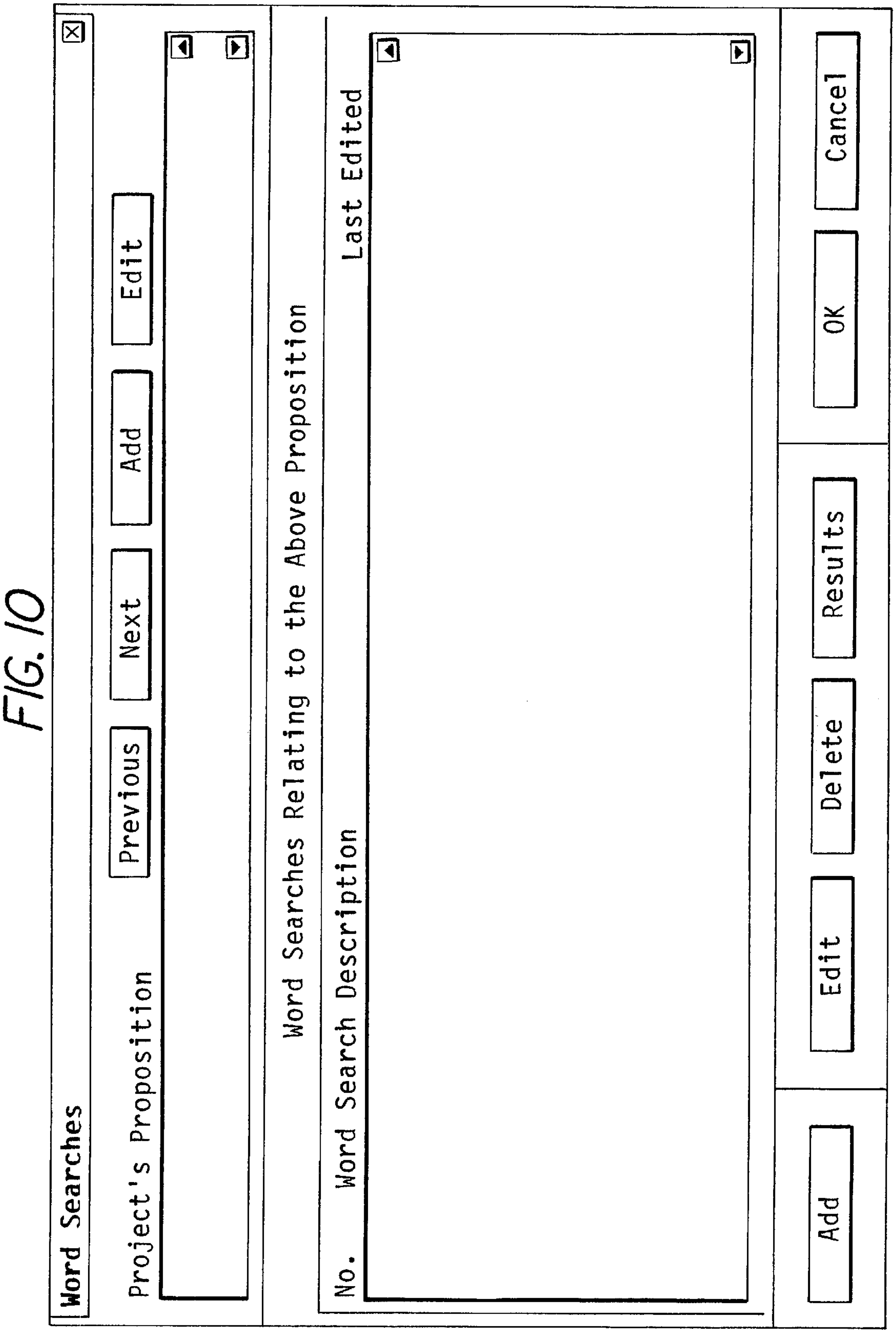
FIG. 10 is a schematic of a word search descriptions window.

Because of the increasing number of on-line and CD-ROM databases, and web sites with search engines, the search for authorities and other data via words, phrases and connectors has become a central component of research projects. Through LRO's Word Searches Window (FIG. 10), the user can view, add, edit and delete word search descriptions tied to the proposition highlighted in the Project's Propositions Window. Each description includes the description number, the word search (e.g., "statute and limitations and malpractice"), and the date the description was last edited. LRO automatically logs the last-edited date. LRO lists the descriptions in ascending order, by description number. Only one description at a time is highlighted. Through the Results Button, the user can view, add to, and edit the results of searching for the highlighted words and phrases within on-line or CD-ROM research databases; Legal Research Organizer; the user's word processing system; and World Wide Web sites.

Figure 11:
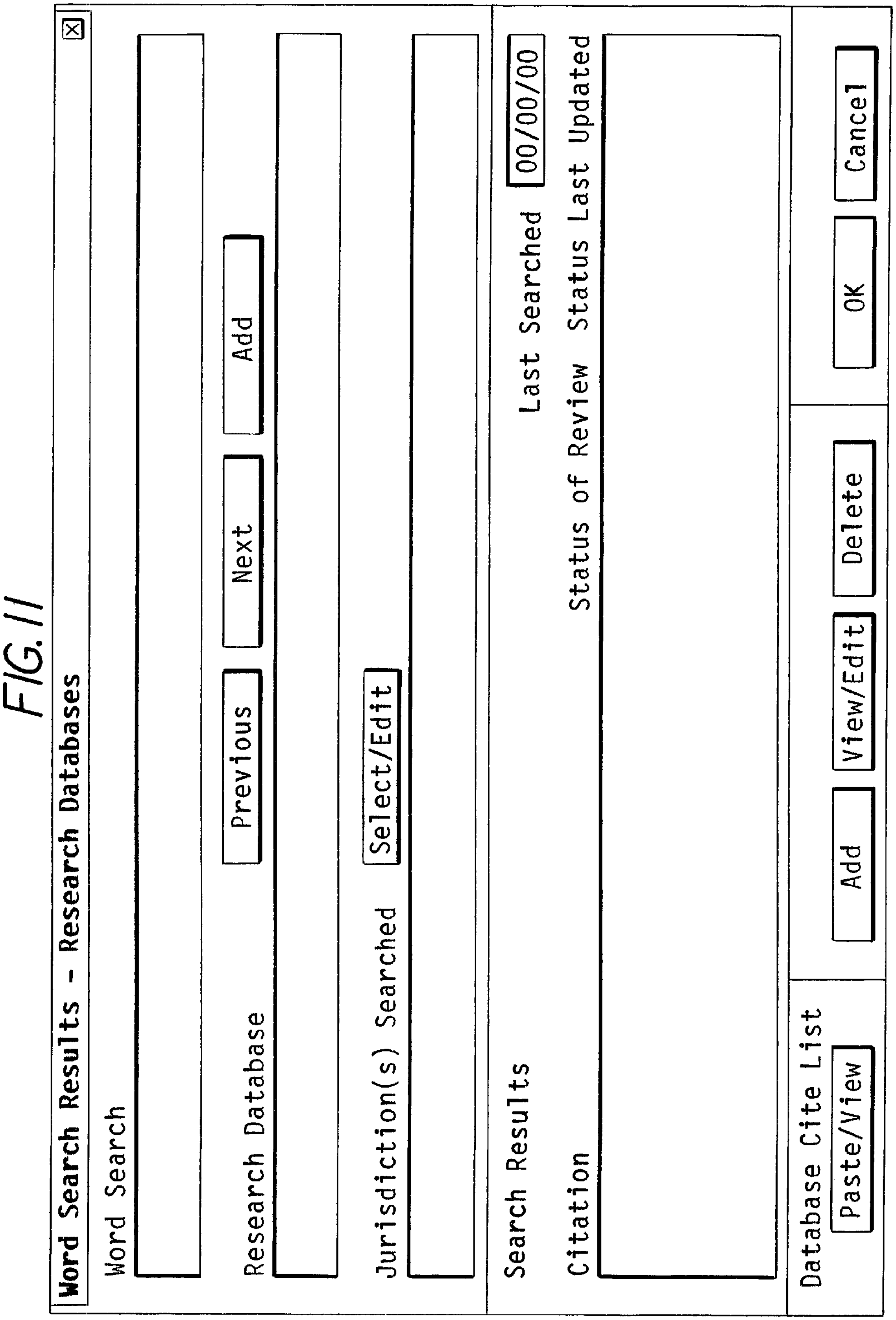
FIG. 11 is a schematic of a research database search results window.

(a) Through LRO's Research Database Search Results Window (FIG. 11), the user can view, add, edit and delete research database citations and related data resulting from the word search highlighted in the Word Searches Window. After performing the word search via a CD-ROM or on-line research database, the user can enter, organize and analyze the results in LRO. The Research Database Search Results Window shows the research database and jurisdictions searched, a list of citations, and other related data entered/edited by the user. Each citation is accompanied by data showing the status of its review (ie., whether the citation has been reviewed and added to the list of authorities, and, if not, the reason), and the date the status was last updated. LRO orders the list of citations alphabetically. Only one citation at a time is highlighted.

(b) Through LRO's Paste/View Research Database Cite List Window, the user can paste a list of citations, downloaded from the CD-ROM or on-line research database, for the word search highlighted in the Word Searches Window. The user can then add one or more of those citations to the Research Database Search Results Window, along with data showing the status of the user's review of each citation. The Cite List Window indicates the date each list relating to the database was pasted.

(c) Legal Research Organizer is itself an important source for authorities and analysis relating to a proposition. By searching through data previously entered in LRO, the user can avoid duplication, and build upon past research and analysis. Through LRO's Legal Research Organizer Search Results Window, the user can view a list of propositions from other LRO projects, resulting from the word search highlighted in the Word Searches Window. LRO automatically searches existing LRO projects for propositions responsive to the word search, and lists those propositions in the Search Results Window. Each proposition description is accompanied by the number of the project to which it is tied, the status of the review of the proposition (which the user can edit), and the date the status was last updated. LRO lists the propositions in descending order, by project number. Only one proposition at a time is highlighted.

(d) Through LRO's View/Copy Other Legal Research Organizer Proposition Data Window, the user can view all data tied to the proposition highlighted in the Legal Research Organizer Search Results Window. LRO displays the data in the Propositions Report format (explained in Step 800, below), outlining all data on the highlighted proposition. All or part of the report can be copied, pasted, printed, or copied to floppy disk.

(e) The user's word processor is another source of helpful information, particularly if memoranda or similar documents relating to a proposition can be located. Through LRO's Word Processor Documents Search Results Window, the user can view, add, edit and delete word processor document descriptions and related data resulting from the word search highlighted in the Word Searches Window. After performing the word search via the user's word processing program, the user can enter, organize and analyze the results in LRO. The Word Processor Documents Search Results Window shows a list of document descriptions and other related data entered/edited by the user. Each description is accompanied by data showing the document number (if applicable), the document name, the status of its review, and the date the status was last updated. LRO orders the list of documents in descending order, by document number. If there are no applicable document numbers, LRO orders the list of document descriptions alphabetically, by document name. Only one document description at a time is highlighted.

(f) Through LRO's Paste/View Word Processor Documents List Window, the user can paste a list of document descriptions, downloaded from the user's word processing program, for the word search highlighted in the Word Searches Window. The user can then add one or more of those descriptions to the Word Processor Documents Search Results Window, along with data showing the status of the user's review of each document. The Documents List Window indicates the date each list was pasted.

(g) Cases, statutes, legislative history, articles and other authorities can now be found at numerous web sites on the Internet, including web sites maintained by state and federal appellate courts and governmental agencies. After performing the word search highlighted in the Word Searches Window, via a web site, the user can enter, organize and analyze the results in LRO. Through LRO's Web Sites Search Results Window, the user can view, add, edit and delete citations obtained from the web site. The Search Results Window shows the web site name and address, jurisdictions searched, a list of citations, and other related data entered/edited by the user. The web site address is in hyper-link text (i.e., double-clicking on the data opens the web address indicated). Each citation is accompanied by the status of its review and the date the status was last updated. LRO orders the list of citations alphabetically. Only one citation at a time is highlighted.

(h) Through LRO's Paste/View Web Site Citation List Window, the user can paste a list of citations, downloaded from the web site, for the word search highlighted in the Word Searches Window. The user can then add one or more of those citations to the Web Site Search Results Window, along with data showing the status of the user's review of each citation. The Citation List Window indicates the date each list was pasted. The web site address is in hyper-link text (i.e., double-clicking on the data opens the web address indicated).

Step 440: Associate Authorities with Each Proposition

Figure 12:
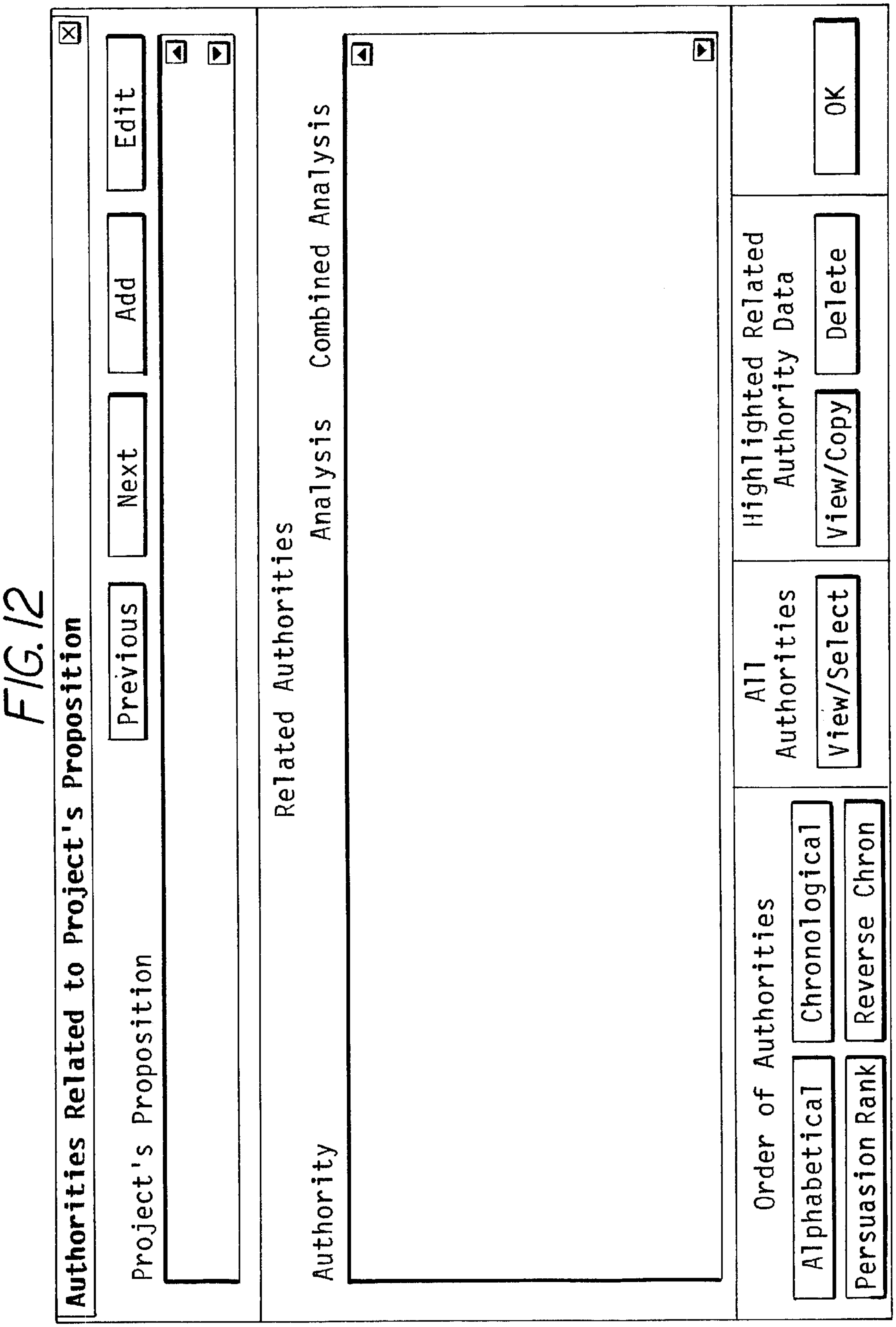
FIG. 12 is a schematic of an authorities related to project's proposition window.

Through LRO's Authorities Related to Project's Proposition Window (FIG. 12), the user can view, add to and edit a list of authorities related to the proposition highlighted in the Project's Proposition Window. The user also can add to the list via the Search Results Windows described above, and the Authorities Window and Citator Results Windows described below. Each authority citation is accompanied by the date the citation was last edited, which is automatically logged by LRO. The user can order the list of authorities alphabetically, chronologically, reverse chronologically, or by persuasion rank. Only one authority at a time is highlighted.

(a) Through LRO's View/Copy Related Authority Data Window, the user can view all authority data that is tied to both the authority highlighted in the Authorities Related to Project's Proposition Window, and the proposition highlighted in the Project's Proposition Window. LRO displays the data in the Authorities Report format (explained in Step 900, below). All or part of the report can be copied, pasted, printed, or copied to floppy disk.

(b) Through LRO's Delete All Highlighted Authority Data Related to Proposition Window, the user can delete all of the data that is tied both to the authority highlighted in the Authorities Related to Project's Proposition Window, and solely to the proposition highlighted in the Project's Proposition Window. The deleted data is stored in the Wastebasket for a pre-defined period. (Lee Step 2070, below.)

Step 500: Input Information Related to Each Authority

Figure 13:
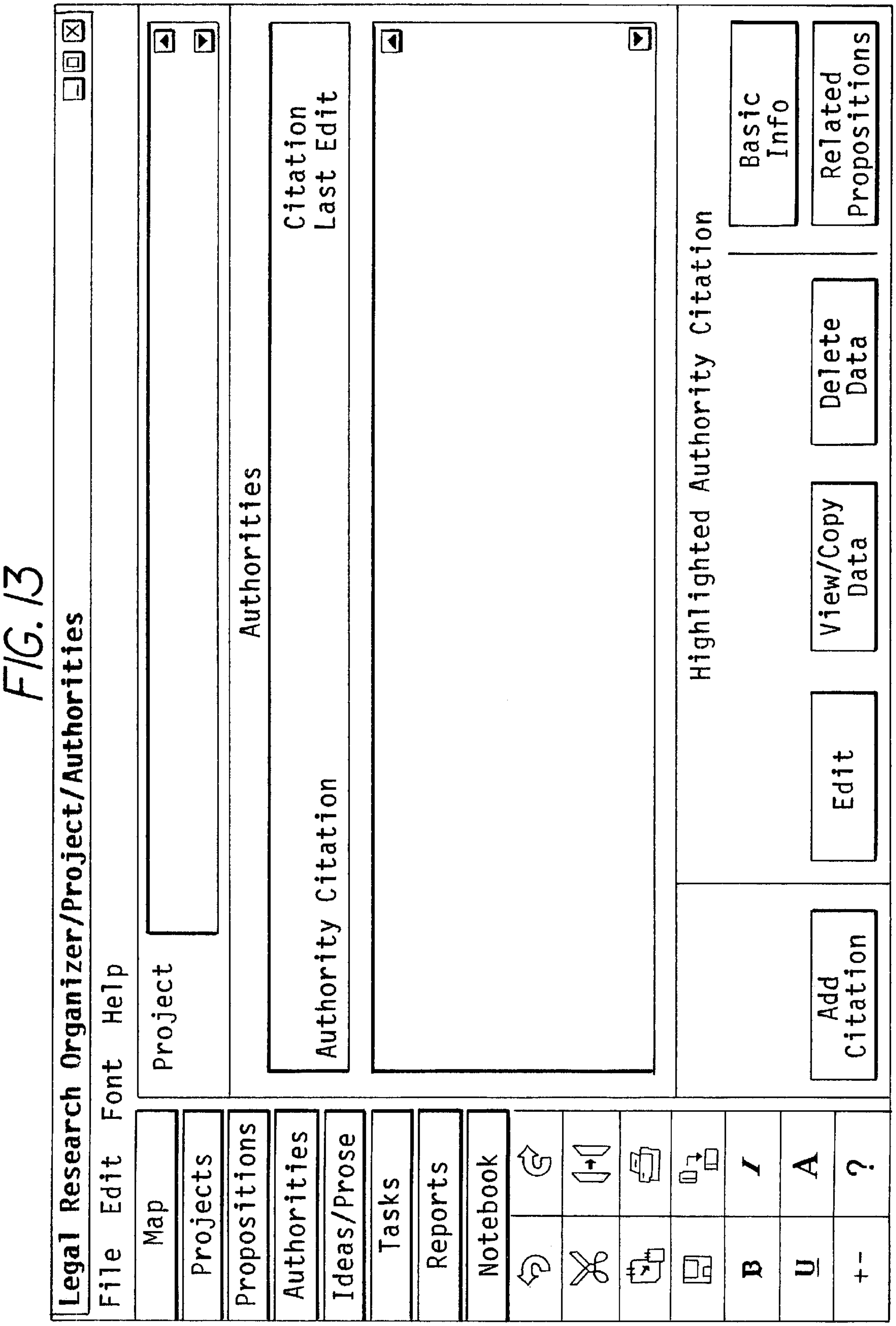
FIG. 13 is a schematic of an authorities window.

Through LRO's Authorities Window (FIG. 13), the user can view, add and edit authority citations tied to the project highlighted in the Projects Window. Each authority citation is accompanied by the date the citation was last edited, which is automatically logged by LRO. The user can also add to the list of authority citations via the Search results Windows described above. LRO orders the list alphabetically. Only one authority citation at a time is highlighted.

(a) Through LRO's View/Copy Authority Data Window, the user can view all data tied to the authority citation highlighted in the Authorities Window. LRO displays the data in the Authorities Report format (explained in Step 900, below), outlining all data on the highlighted authority. All or part of the report can be copied, pasted, printed, or copied to floppy disk.

(b) Through LRO's Delete All Authority Data Window, the user can delete all data on the authority citation highlighted in the Authorities Window. The deleted data is stored in the Wastebasket for a pre-defined period. (See Step 2070, below.)

Step, 510: Input Basic Information Related to Each Authority

Figure 14:
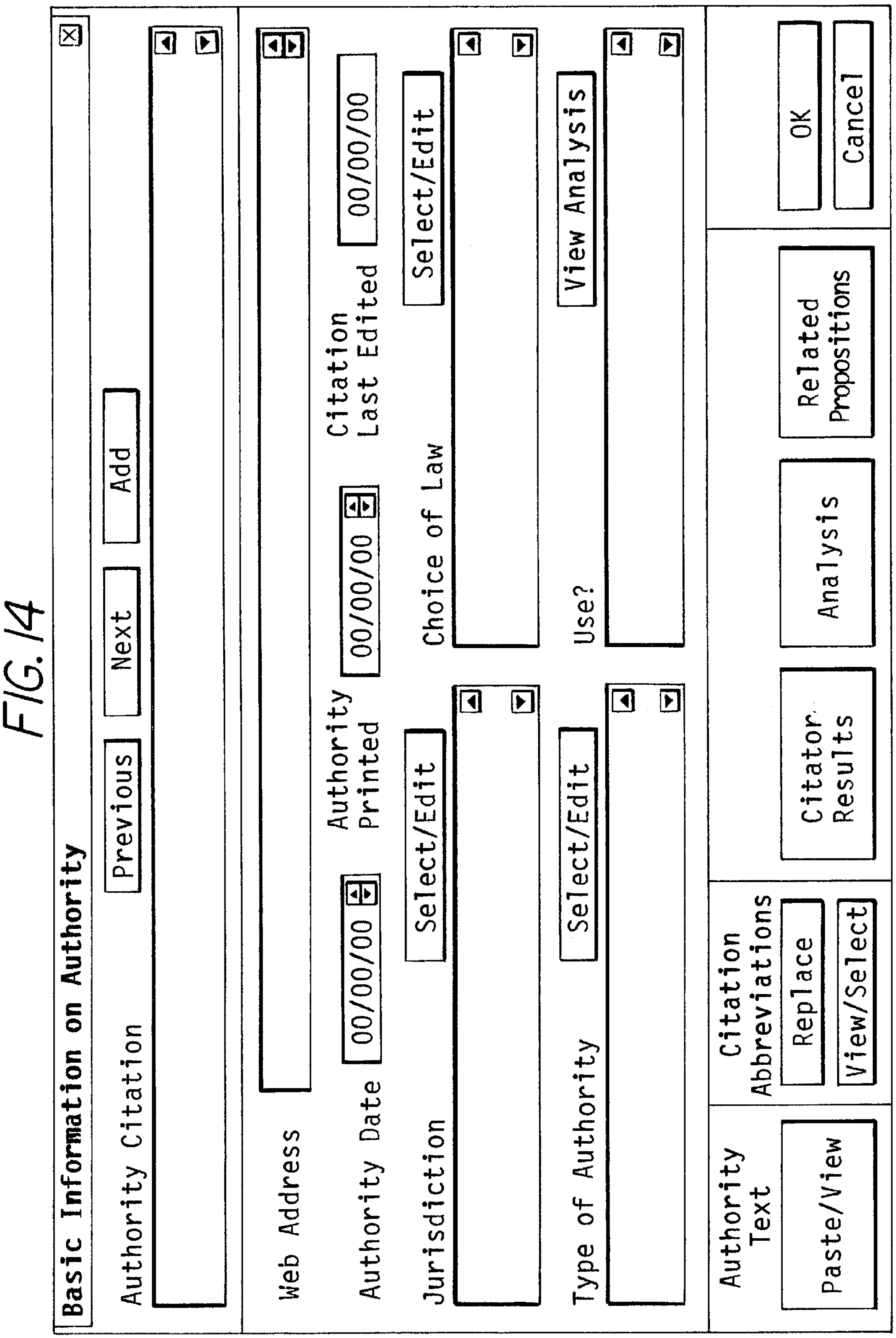
FIG. 14 is a schematic of a basic information on authority window.

Through LRO's Basic Information on Authority Window (FIG. 14), the user can edit the citation to the authority highlighted in the Authorities Window. The user can also view, add and edit relevant, non-analytical information regarding the authority, including the date of the authority, the jurisdiction(s) and choice(s) of law to which the authority pertains, and the type of authority. In legal research, authority types may include cases, statutes, regulations, and other references.

(a) Citations to authorities typically must conform to abbreviation requirements. In LRO, the user can automatically convert a word in a citation to the correct abbreviation by highlighting the word and pressing the Citation Abbreviation Replace Button in the Basic Information on Authority Window. The user can also select and automatically insert a correct abbreviation into a citation through LRO's View/Select Citation Abbreviations Window.

(b) Through LRO's Paste/View Authority Text Window, the user can paste the text of an authority downloaded from a web site, CD-ROM or on-line database. The user can then copy and paste relevant authority text for purposes of the Authority Analysis Windows, described below.

Step 520: Input Citator Services Information Related to Each Authority

Figure 15:
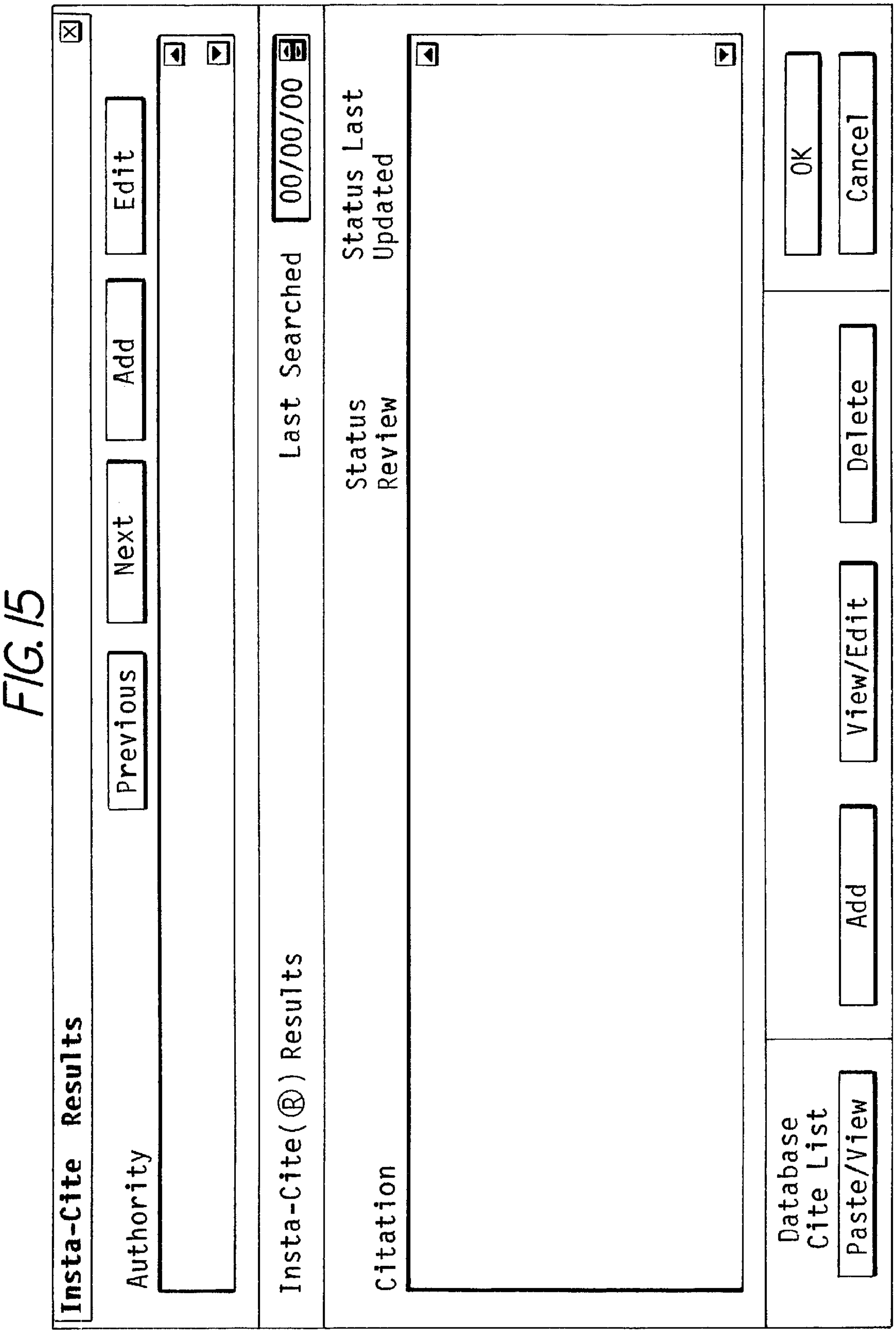
FIG. 15 is a schematic of an Insta-Cite® results window.

West Publishing Corporation's Insta-Cite® citator service, and LEXIS-NEXIS's Auto-Cite® citator service, are important tools for finding additional citations related to an authority and proposition. Through LRO's Insta-Cite® Results Window (FIG. 15) and the Auto-Cite® Results Window (now shown), the user can view, add, edit and delete citations and related data resulting from on-line Insta-Cite® and Auto-Cite® checks of the authority citation highlighted in the Authorities Window. After performing the checks, the user can enter, organize and analyze the results in LRO. The Insta-Cite® Results Window and the Auto-Cite® Results Window show a list of citations and other related data entered/edited by the user. Other related data includes headnotes from the various citator services. A headnote is a syllabus to a reported case or a summary of the points decided in the case, which is placed at the head or beginning of the opinion. Each citation is accompanied by data showing the status of its review and the date the status was last updated. LRO orders the list of citations alphabetically. Only one citation at a time is highlighted.

(a) Through LRO's Paste/View Insta-Cite® List Window and the Paste/View Auto-Cite® List Window, the user can paste a list of citations, downloaded from the Insta-Cite® and Auto-Cite® citator services, related to the authority highlighted in the Authorities Window. The user can then add one or more of those citations to the Insta-Cite® Search Results Window and Auto-Cite® Search Results Window, along with data showing the status of the user's review of each citation. The Cite List Window indicates the date each list relating to the authority was pasted.

(b) Matthew-Bender & Co., Inc.'s Shepards® citator service is another important tool for finding citations related to an authority and proposition. Through LRO's Shepards® Results Window, the user can view, add, edit and delete citations and related data resulting from Shepardizing® the authority citation highlighted in the Authorities Window. After Shepardizing® (via books, or CD-ROM or on-line database), the user can enter, organize and analyze the results in LRO. The Shepards® Results Window shows a list of citations and other related data entered/edited by the user. Each citation is accompanied by data showing the Shepards® analysis code, applicable headnote and jurisdiction, status of the user's review of the citation, and the date the status was last updated. LRO lists the citations in the order in which they were entered. Only one citation at a time is highlighted.

(c) Through LRO's Paste/View Shepards® Cite List Window, the user can paste a list of citations, downloaded from the Shepards® citator service, related to the authority highlighted in the Authorities Window. The user can then add one or more of those citations to the Shepards® Results Window, along with data showing the status of the user's review of each citation. The Cite List Window indicates the date each list relating to the authority was pasted.

(d) West Publishing Corporation's KeyCite® citator service is another helpful tool for finding citations related to an authority and proposition. Through LRO's KeyCite® Results Window, the user can view, add, edit and delete citations and related data resulting from on-line KeyCite® checks of the authority citation highlighted in the Authorities Window. After performing the check, the user can enter, organize and analyze the key cite search results in LRO. The KeyCite® Results Window shows the project's proposition related to the authority, the related headnotes and Key Numbers®, a list of citations, and other related data entered/edited by the user. Each citation is accompanied by data showing the status of its review and the date the status was last updated. LRO orders the list of citations alphabetically. Only one citation at a time is highlighted.

(e) Through LRO's Paste/View KeyCite® List Window, the user can paste a list of citations, downloaded from the KeyCite® citator service, related to the authority highlighted in the Authorities Window. The user can then add one or more of those citations to the KeyCite® Search Results Window, along with data showing the status of the user's review of each citation. The Cite List Window indicates the date each list relating to the authority was pasted.

Step 530: Input Analysis Relating to Each Authority

Figure 16:
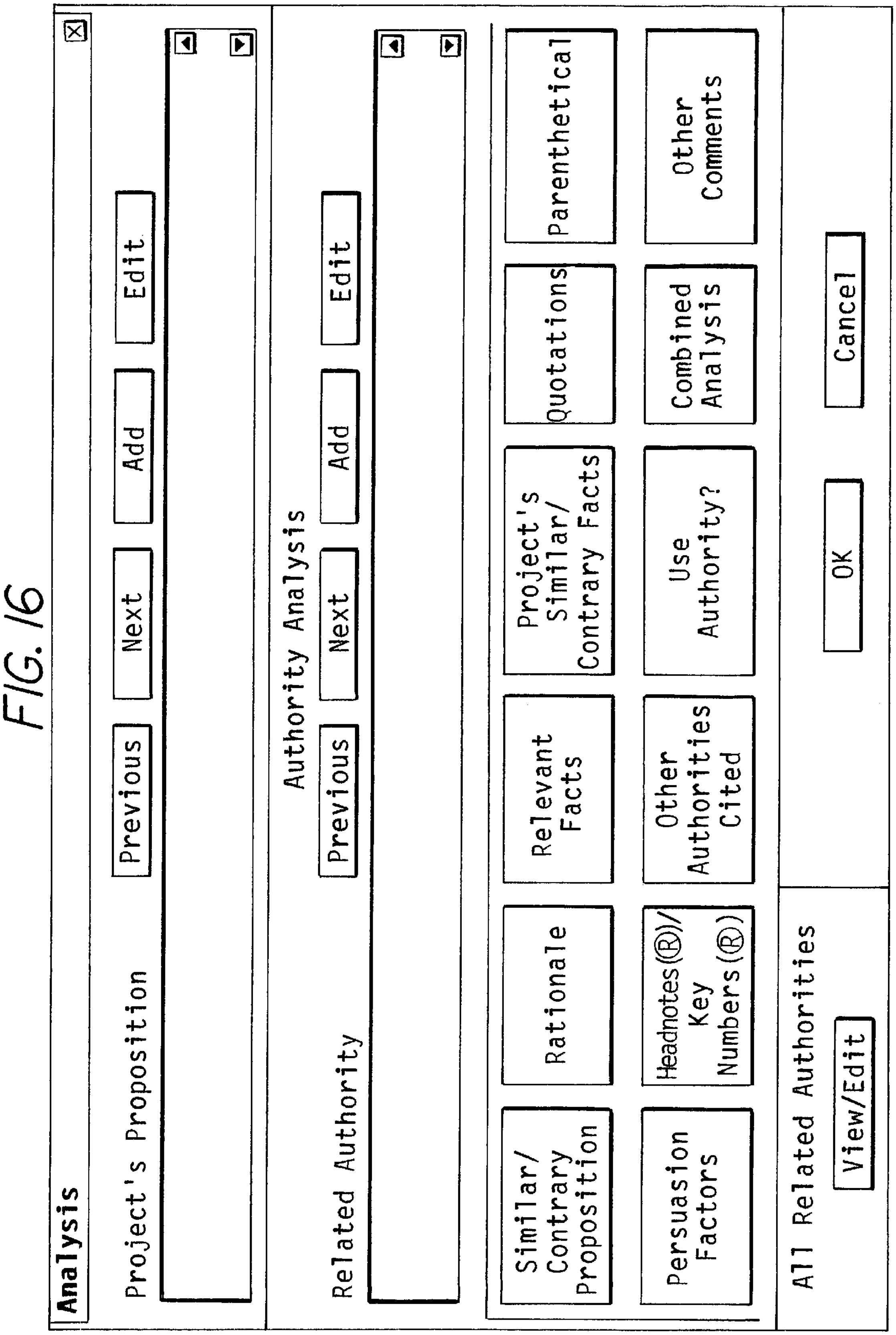
FIG. 16 is a schematic of an authority analysis window.

Through LRO's Authority Analysis Windows (FIG. 16), the user can view, add and edit analytical data tied to both the authority highlighted in the Authorities Window and the proposition highlighted in the Project's Propositions Window. The data includes the authority's similar or contrary proposition; the authority's rationale for its proposition; the authority's relevant facts; the project's similar or contrary facts; the authority's persuasion factors; the authority's relevant quotations; relevant parenthetical for the authority; the authority's relevant headnotes and Key Numbers; other relevant authorities cited by the authority; whether to use the authority; other comments regarding the authority; and (where applicable) the relevant pages of the authority where the above information is located. In each window, LRO automatically logs the date on which the data was last edited.

Figure 17:
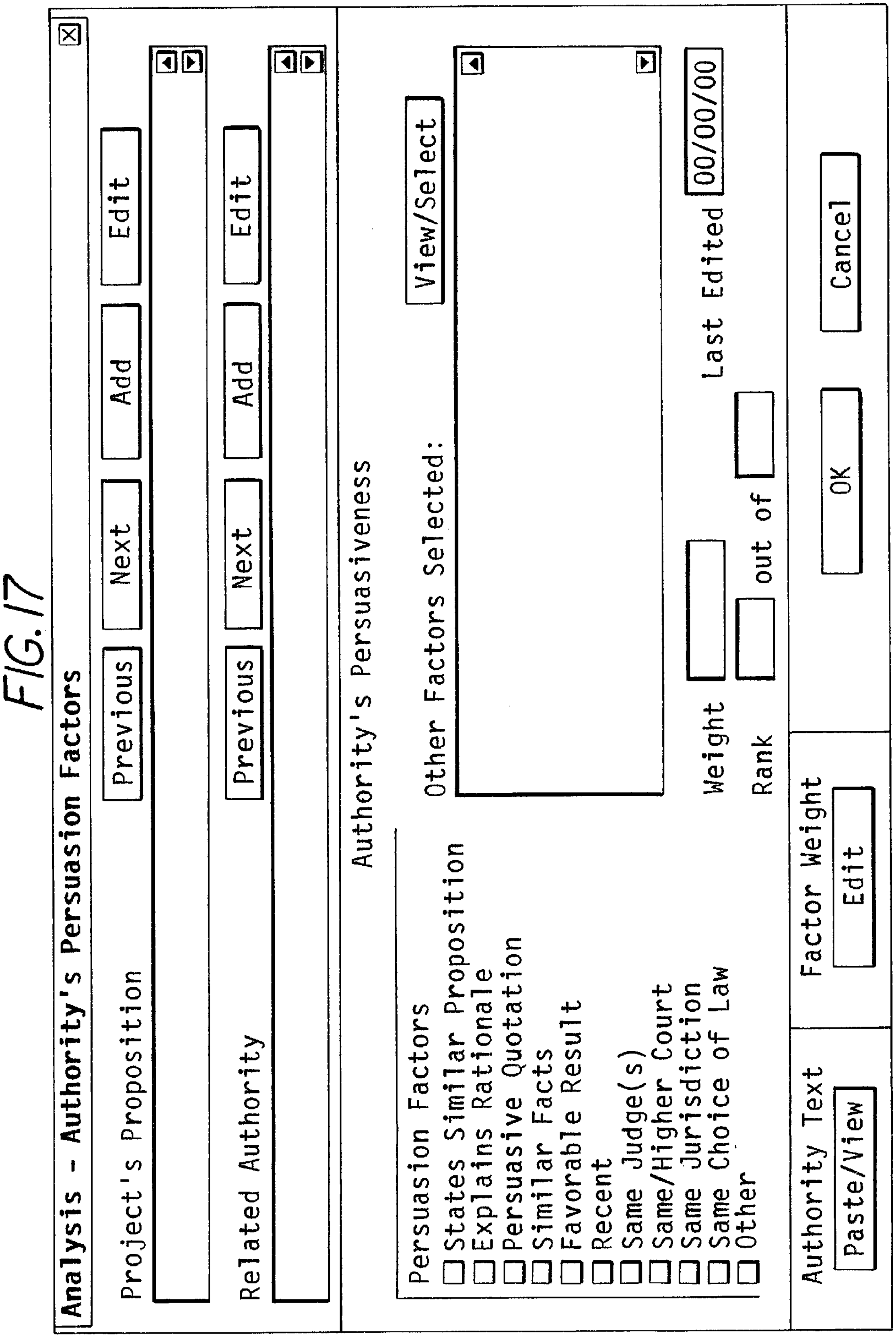
FIG. 17 is a schematic of an authority's persuasion factors window.

(a) Through LRO's Authority's Persuasion Factors Window (FIG. 17), the user can view and select from pre-set factors which typically affect the persuasiveness of an authority. In selecting those factors, the user determines whether the authority: states a proposition similar to the proposition highlighted in the Project's Proposition Window; explains the rationale underlying the proposition; contains a persuasive quotation; involves facts that are similar to the project's facts; concludes with a favorable result; was issued recently; involved the same judge or judges, or the same or higher court, than is involved in the matter underlying the project; or pertains to the same jurisdiction or choice of law to which the project pertains. The user can also add other persuasion factors, and adjust the weight assigned to each persuasion factor for all authorities.

(b) Through LRO's View/Copy Ranked Related Authority Data Window, the user can view all authority data that is tied to both the authority highlighted in the Authorities Related to Project's Proposition Window, and the proposition highlighted in the Project's Proposition Window, with the authorities ranked in accordance with their persuasiveness. LRO determines the persuasion rank in accordance with the persuasion factor weights, for example, by summing the weights LRO displays the data in the Propositions Report format (explained in Step 900, below), with the authorities listed in descending order, by persuasion rank. All or part of the report can be copied, pasted, printed, or copied to floppy disk.

(c) Through LRO's Other Relevant Authorities Cited Window, the user can view, add to and edit a list of other relevant authorities cited by the authority highlighted in the Authorities Window. Each authority citation is accompanied by data showing the status of its review and the date the status was last updated. LRO orders the list of citations alphabetically. Only one citation at a time is highlighted.

(d) Through LRO's Paste/View List of Other Authorities Cited Window, the user can paste a list of the other authorities cited, downloaded from a CD-ROM or on-line research database. The user can then add one or more of those citations to the Other Relevant Authorities Cited Window, along with data showing the status of the user's review of each citation.

Figure 18:
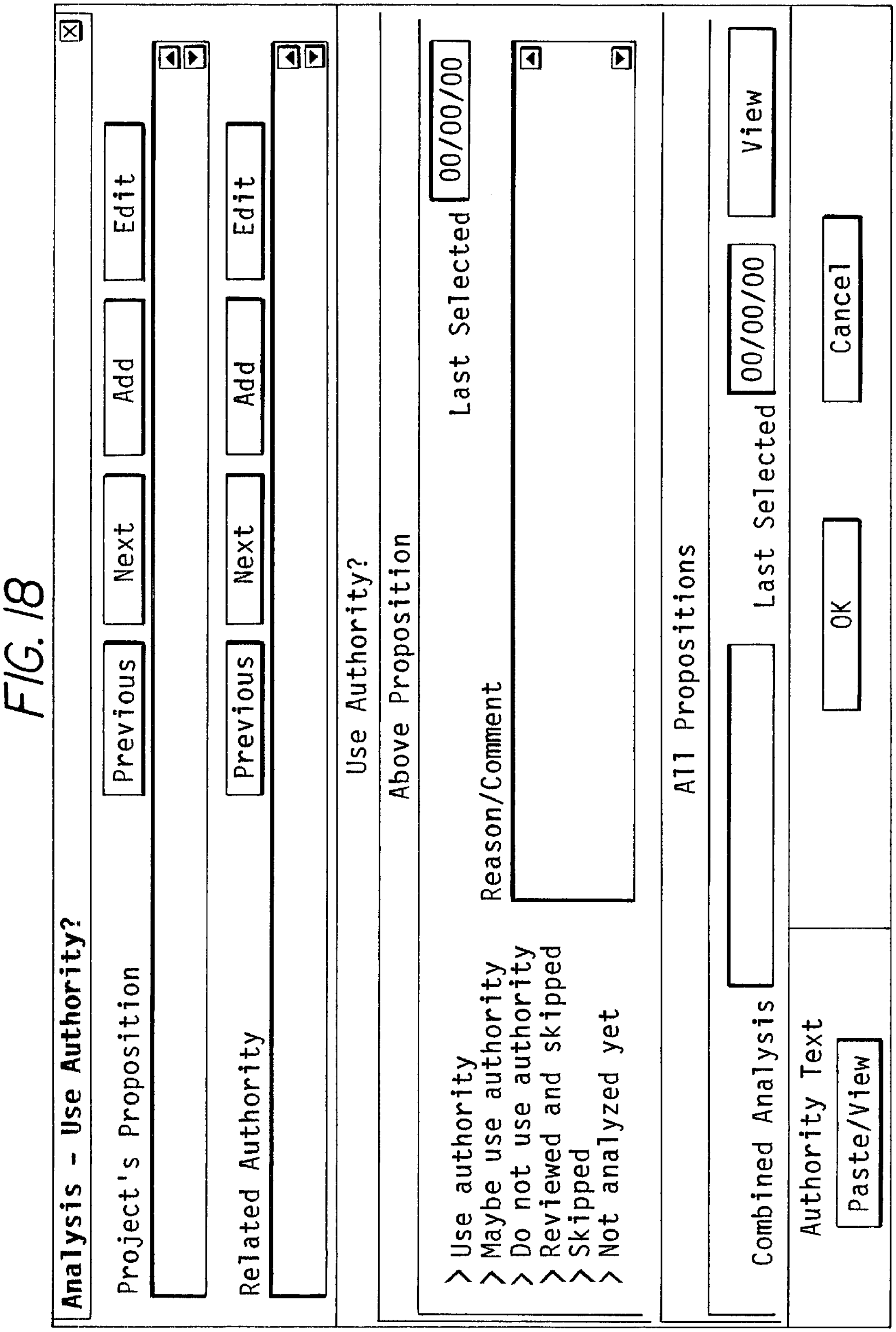
FIG. 18 is a schematic of an authority use indicator window.

(e) Through LRO's Use Authority? Window (FIG. 18), the user can view and select options relating to whether the authority highlighted in the Authorities Window should be used in connection with the proposition highlighted in the Project's Proposition Window. The options include: use authority; maybe use authority; do not use authority; reviewed and skipped; skipped; and not analyzed yet. The user can enter/edit a reason or comment relating to the option selected. LRO logs the date an option was last selected. Through LRO's Use?—Analysis of All Propositions Window, the user can view a combined analysis of whether the authority should be used in connection with the entire project. LRO automatically compares the options selected for all propositions related to the authority, and determines the combined analysis.

Step 540: Associate Propositions with Each Authority

Figure 19:
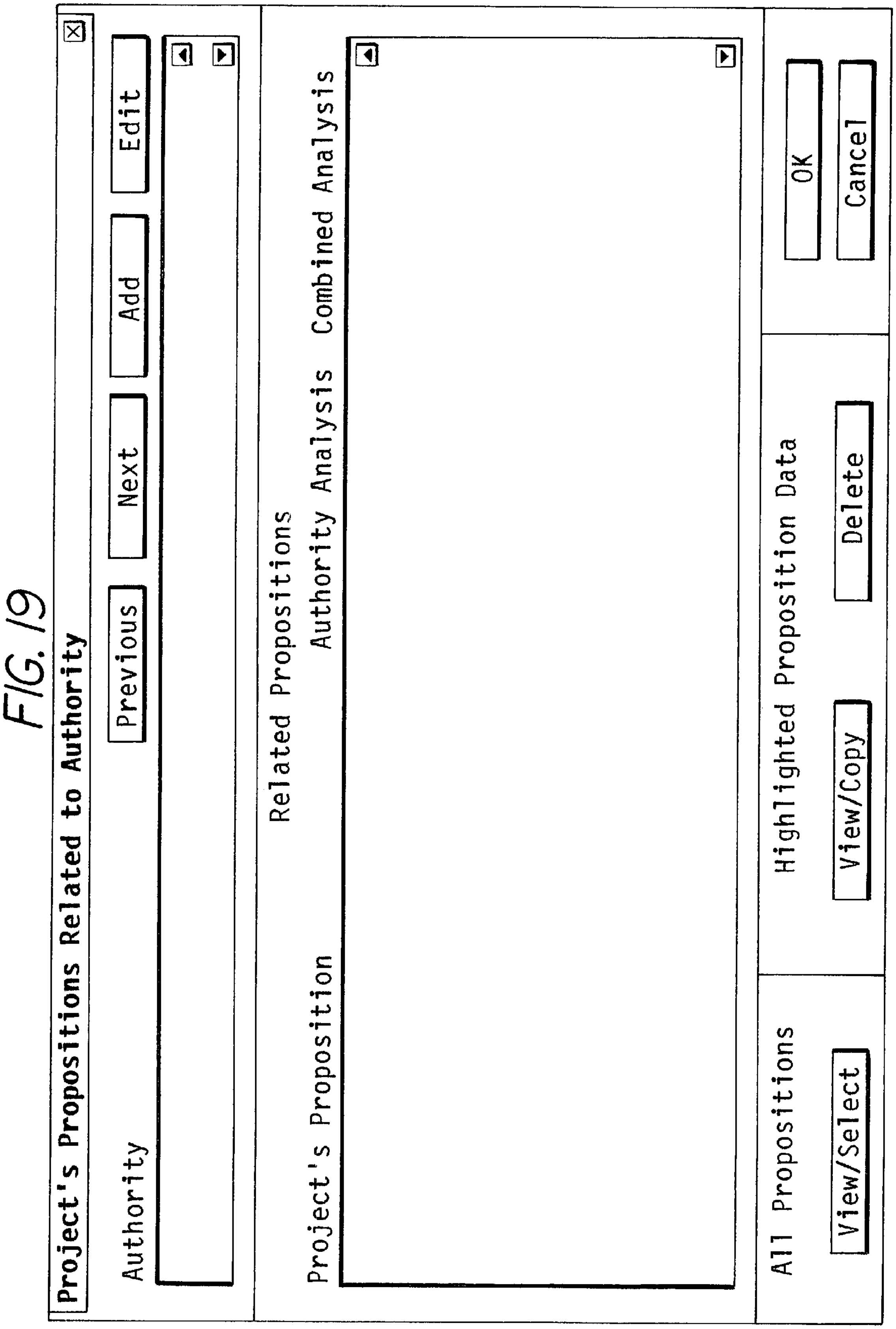
FIG. 19 is a schematic of a project's propositions related to authority window.

Through LRO's Project's Propositions Related to Authority Window (FIG. 19), the user can view, add to and edit a list of the project's propositions related to the authority highlighted in the Authorities Window. The user also can add to the list via the Search Results Windows, the Authorities Window, and the Citator Results Windows described above. LRO lists the propositions in ascending order, by proposition number. Only one proposition at a time is highlighted.

(a) Through LRO's View/Copy Related Proposition Data Window, the user can view all proposition data that is tied to both the proposition highlighted in the Project's Propositions Related to Authority Window, and the authority highlighted in the Authorities Window. LRO displays the data in the Propositions Report format (explained in Step 900, below). All or part of the report can be copied, pasted, printed, or copied to floppy disk.

(b) Through LRO's Delete All Highlighted Proposition Data Related to Authority Window, the user can delete all of the data that is tied both to the proposition highlighted in the Project's Propositions Related to Authority Window, and solely to the authority highlighted in the Authorities Window. The deleted data is stored in the Wastebasket for a pre-defined period. (See Step 2070 and (c), below.)

Step 600: Input Information Related to Each Idea/prose Item

Figure 20:
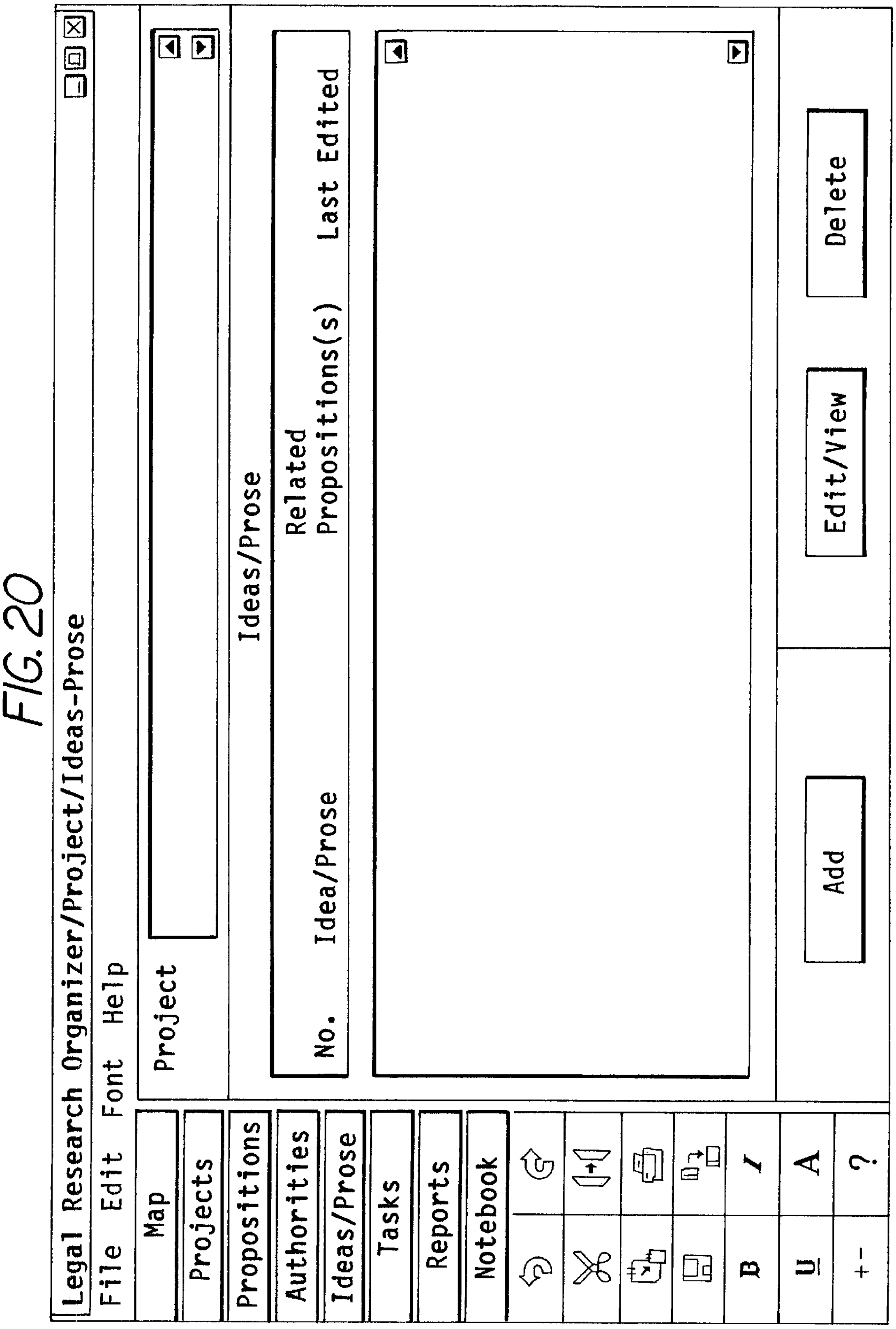
FIG. 20 is a schematic of an ideas/prose window.

During the research and analysis process, ideas and effective ways of phrasing points often occur to the researcher. Those ideas and items of prose are typically lost if they are not recorded when they occur. Through LRO's Ideas/Prose Window (FIG. 20), the user can view, add, edit and delete ideas and prose, and related data, tied to the project highlighted in the Projects Window. Each idea/prose item is accompanied by a number (which is assigned by the user), the propositions (if any) to which the idea/prose relates, and the date the idea/prose and related data was last edited (which is automatically logged by LRO). LRO lists the ideas/prose in ascending order, by number. Only one idea/prose item at a time is highlighted.

Step 700: Input Information Related to Each Task

Figure 21:
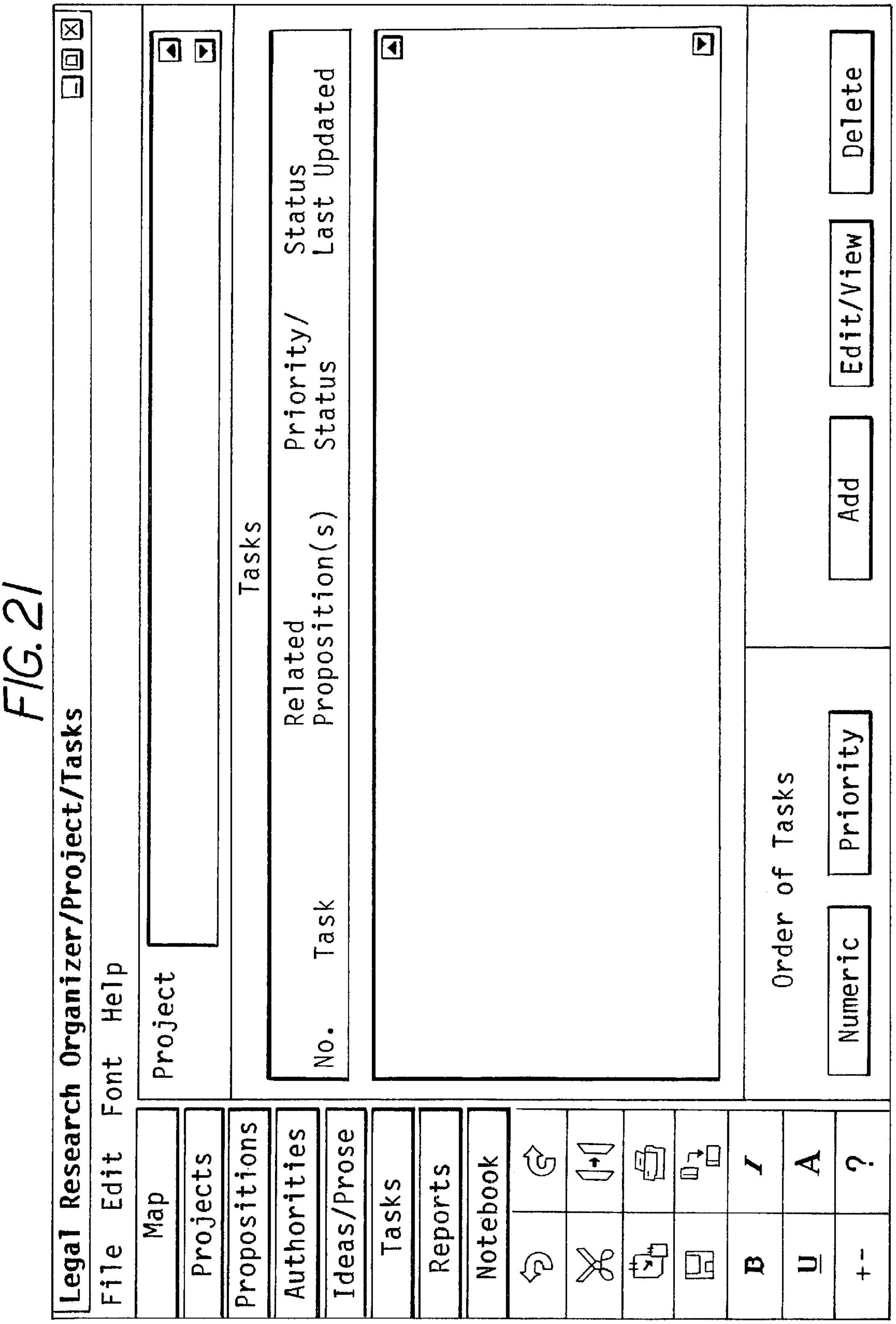
FIG. 21 is a schematic of a tasks window.

An ongoing "to do"list is an important part of a thorough research and analysis process; otherwise useful tasks may be overlooked. Through LRO's Tasks Window (FIG. 21), the user can view, add, edit and delete tasks and related data tied to the project highlighted in the Projects Window. Each task description is accompanied by a number (which is assigned by the user), data showing the priority of the task and the status of completion, and the date the status was last updated (which is automatically logged by LRO). The user can choose whether LRO orders the tasks by number or priority. Only one task at a time is highlighted.

Step 800: Output a Propositions Report Displaying Information Associated Selected Propositions; and Step 900: Output an Authorities Report Displaying Information Associated Selected Authorities As discussed above, a key feature of Legal Research Organizer is its ability to automatically create a tailored report on all or part of the data in a project, at the touch of a button. That report can then be used to prepare a memorandum or other written product relating to the research project. Through LRO's Reports Window, the user can view, add, edit and delete reports which outline all or part of the data tied to one or more propositions, or one or more authorities. LRO automatically creates a report based on the user's selection from a Propositions Report Menu or an Authorities Report Menu. LRO creates and lists a description of the report in the Reports Window, along with a last-edited date (logged by LRO) and a report number (which can be edited by the user). LRO also creates and lists that information when a report is first created via the View/Copy Data Windows described above. Only one report description at a time is highlighted. The user can view the highlighted report through LRO's View/Copy Report Window. All or part of the report can be copied, pasted, printed, or copied to floppy disk.

Figure 22:
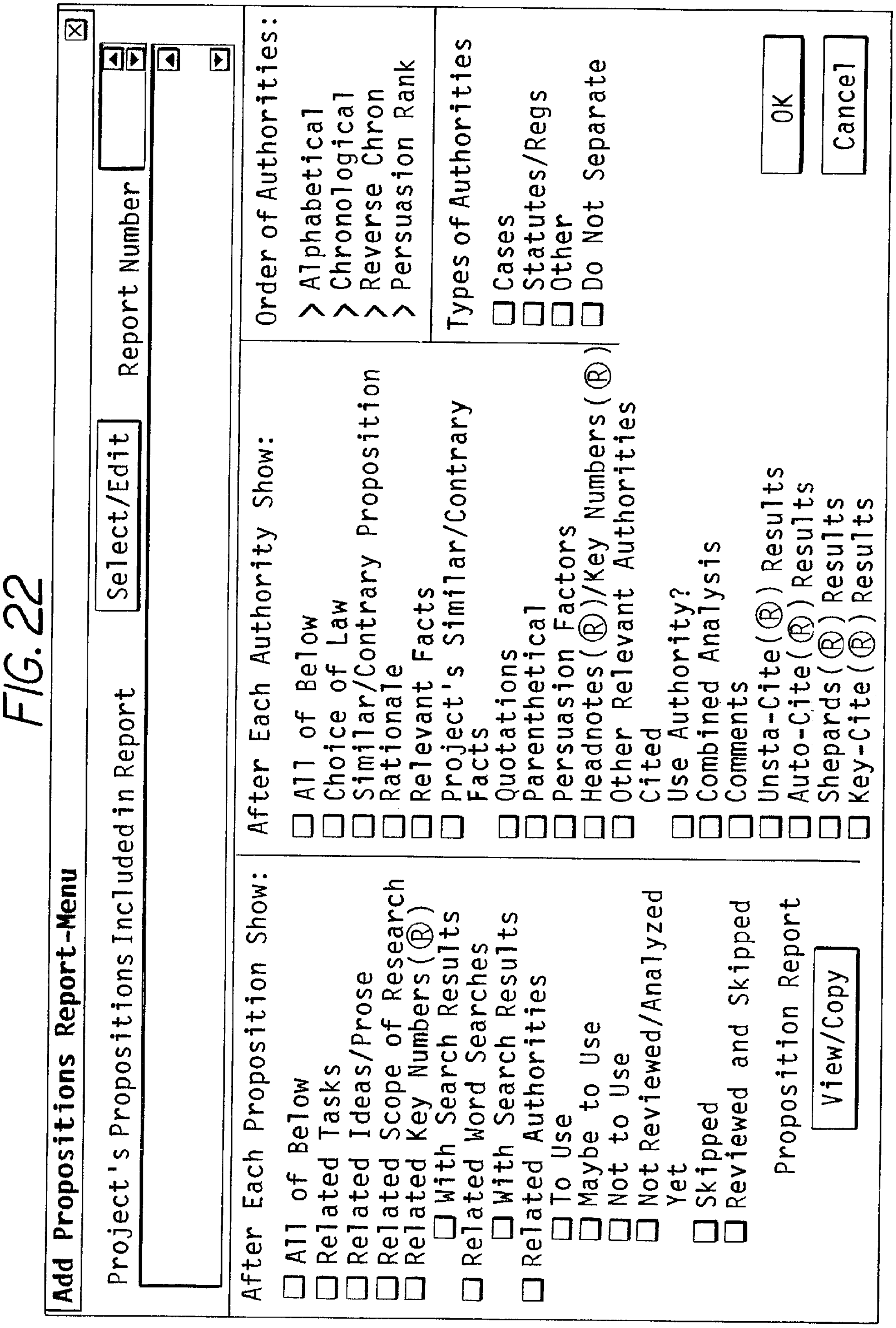
FIG. 22 is a schematic of a propositions report menu window.

(a) Through LRO's Propositions Report Menu Window (FIG. 22), the user can view, select and edit the data to be included in a Propositions Report, which is then automatically created by LRO. The Propositions Report format outlines data tied to one or more of the propositions tied to the project highlighted in the Projects Window. The user can select the propositions to be included in the report. LRO lists the propositions in an index at the beginning of the report, with page references indicating the location of the proposition data. LRO also lists the user's menu selections at the beginning of the report.

(1) The user can select all or part of the following data to be included after each proposition:

- Related tasks (including the number, description, priority, status, and status last-updated date for each task);
- Related ideas/prose (including the number, description, and last-edited date for each idea/prose item);
- Scope of research (including the date range, jurisdiction(s), choice(s) of law, and type(s) of authorities, and last-edited date for each);
- Related Key Numbers® (including each digest topic/subtopic, topic number, Key Number®, and last-searched date);
- Related Key Number® search results (including the jurisdictions searched, last-edited date, and last-searched date for each Key Number®, and the status of review and status last-updated date for each citation located under each Key Number®);
- Related word searches (including the number and last-edited date for each word search description);
- Results for each word search:
  - Research databases (including jurisdictions searched, last edited date, and last-searched date for each database searched, and the status of review and status last-updated date for each citation located in each research database);
  - Legal Research Organizer (including the last searched date, and the project number, description, status of review, and status last-updated date for each other project's proposition);
  - Word processor documents (including the last searched date, and the number (if applicable), description, status of review, and status last-updated date for each word processor document);
  - Web sites (including jurisdictions searched, last-edited date, and last-searched date for each web site searched, and the status of review and status last-updated date for each citation located in each web site);
  - All of the above word search result data;
- Related authorities:
  - To use;
  - Maybe to use;
  - Not to use;
  - Not reviewed/analyzed yet;
  - Skipped;

Reviewed and skipped;

All of the above related authority data.

(2) The user can select all or part of the following data to be included after each related authority citation:

Authority's choice(s) of law;

Authority's similar/contrary proposition (including relevant page(s) and last-edited date);

Authority's rationale (including relevant page(s) and last-edited date);

Authority's relevant facts (including relevant page(s) and last edited date);

Project's similar/contrary facts (including last-edited date);

Authority's relevant quotations (including relevant page(s) and last-edited date);

Relevant parenthetical (including relevant page(s) and last-edited date);

Authority's persuasion factors (including persuasion weight and rank, and last-edited date);

Authority's headnotes/Key Numbers (including last-edited date, and each headnote number, digest topic/subtopic, topic number and Key Number);

Other relevant authorities cited (including last-edited date, and the status of review and status last-updated date for each citation);

Use authority? (including last-edited date, the analysis, reason/comment and last-selected date for the proposition, and the combined analysis and last-selected date for all propositions);

Other comments regarding the authority (including the number and last-edited date for each comment);

Insta-Cite® results (including last-searched date, and the status of review and status last-updated date for each citation);

Auto-Cite® results (including last-searched date, and the status of review and status last-updated date for each citation);

Shepards® results (including last searched date, and the Shepards analysis code, applicable headnote and jurisdiction, status of review and status last-updated date for each citation);

KeyCite® results (including last-searched date, and the status of review and status last-updated date for each citation).

(3) The user can choose to have LRO order the authorities alphabetically, chronologically, reverse-chronologically, or by persuasion rank. LRO automatically separates the authorities into three types: cases, statutes/regulations and other. The user can choose to have LRO not separate by type of authority, or to exclude one or more of the authority types from the report.

Figure 23:
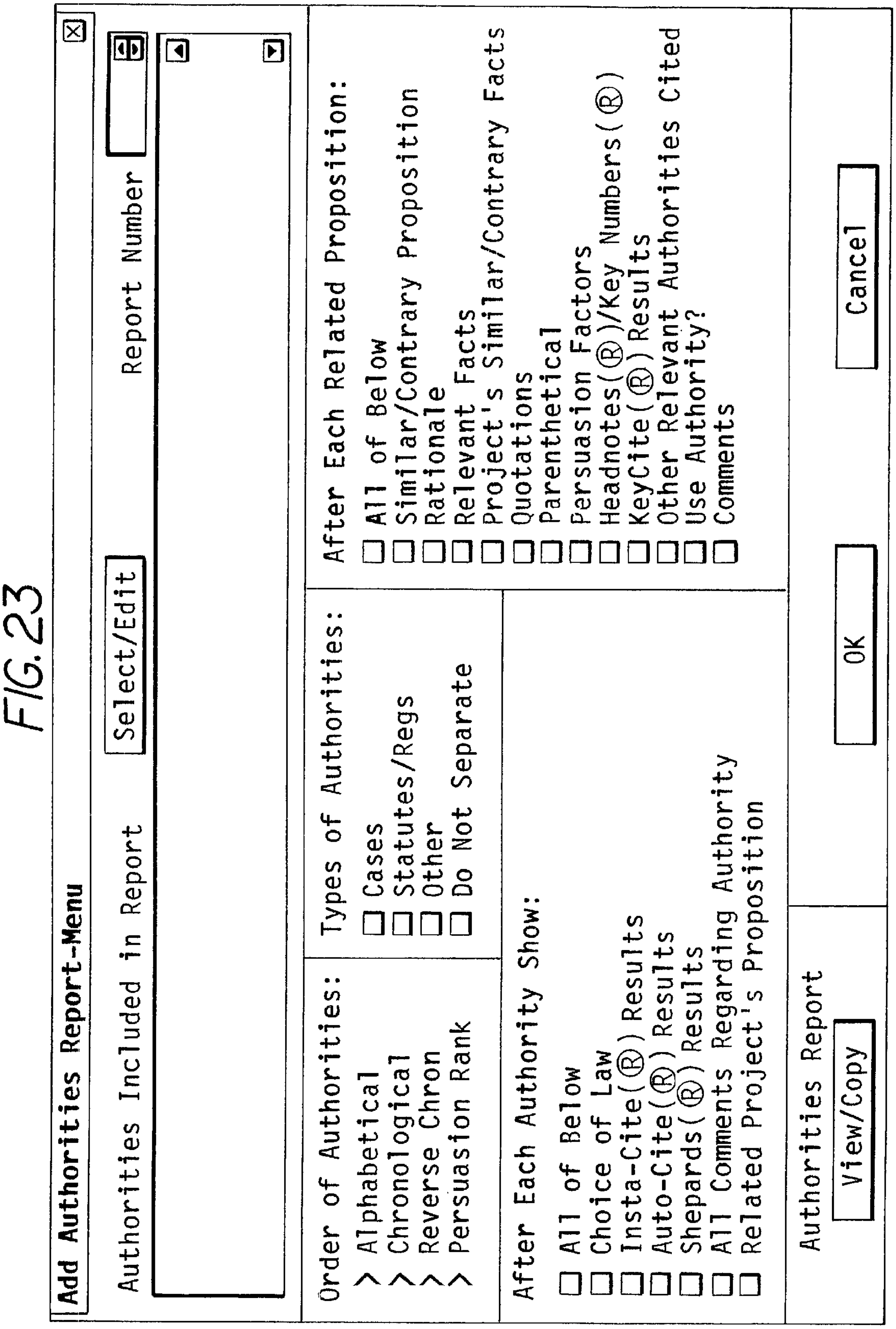
FIG. 23 is a schematic of an authorities report menu window.

(b) Through LRO's Authorities Report Menu Window (FIG. 23), the user can view, select and edit the data to be included in an Authorities Report, which is then automatically created by LRO. The Authorities Report format outlines data tied to one or more of the authorities tied to the project highlighted in the Projects Window. The user can select the authorities to be included in the report. LRO lists the authorities in an index at the beginning of the report, with page references indicating the location of the authority data. LRO also lists the user's menu selections at the beginning of the report.

(1) The user can select all authorities, specific authorities, or one or more of the following authority groups, to be included in the report:

Authorities to use;

Authorities maybe to use;

Authorities not to use;

Authorities not reviewed/analyzed yet;

Authorities skipped;

Authorities reviewed and skipped.

(2) The user can choose to have LRO order the authorities alphabetically, chronologically, reverse chronologically, or by persuasion rank. LRO automatically separates the authorities into three types: cases, statutes/regulations and other. The user can choose to have LRO not separate by type of authority, or to exclude one or more of the authority types from the report.

(3) The user can select all or part of the following data to be included after each authority:

Authority's choice(s) of law;

Insta-Cite® results (including last-searched date, and the status of review and status last-updated date for each citation);

Auto-Cite® results (including last-searched date, and the status of review and status last-updated date for each citation);

Shepards® results (including last searched date, and the Shepards analysis code, applicable headnote and jurisdiction, status of review and status last-updated date for each citation);

All comments regarding the authority (including the number and last-edited date for each comment);

Related propositions.

(4) The user can select all or part of the following data to be included after each related proposition in the report:

Authority's similar/contrary proposition (including relevant page(s) and last-edited date);

Authority's rationale (including relevant page(s) and last-edited date);

Authority's relevant facts (including relevant page(s) and last-edited date);

Project's similar/contrary facts (including last-edited date);

Authority's relevant quotations (including relevant page(s) and last-edited date);

Relevant parenthetical (including relevant page(s) and last-edited date);

Authority's persuasion factors (including persuasion weight and rank, and last-edited date);

Authority's headnotes/Key Numbers® (including last-edited date, and each headnote number, digest topic/subtopic, topic number and Key Number®;

KeyCite® results (including last-searched date, and the status of review and status last-updated date for each citation);

Other relevant authorities cited (including last-edited date, and the status of review and status last-updated date for each citation);

Use authority? (including last-edited date, the analysis, reason/comment and last-selected date for the proposition, and the combined analysis and last-selected date for all propositions);

Other comments regarding the authority (including the number and last-edited date for each comment).

Figure 24:
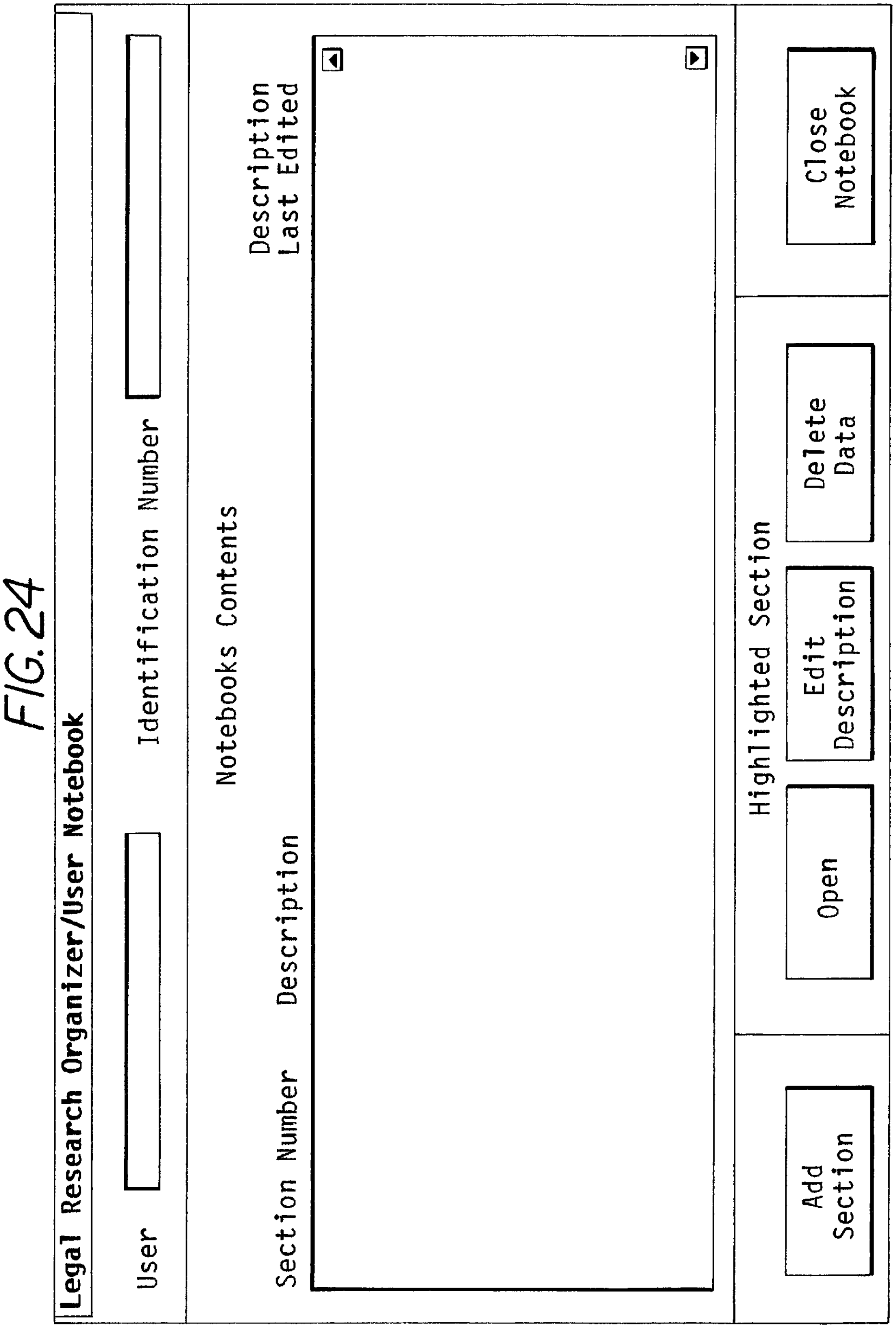
FIG. 24 is a schematic of a user notebook contents window.

Step 1000: Input General Notes Common to All Legal Research Projects in a User Notebook LRO's User Notebook enables the user to maintain general notes (e.g., file numbers, passwords, indices, bibliographies, web site addresses, frequently-used references and databases, and similar data) that is common to all research projects. Through LRO's User Notebook Window (FIG. 24), the user can view, add to, edit and delete the contents of the user's personal notebook. The User Notebook Window includes a description of each section of the user's notebook, accompanied by a number (assigned by the user) and the date last edited (automatically logged by LRO). LRO lists the section descriptions in ascending order, by number. Only one description at a time is highlighted.

Step 2000: Other Data Processing Activities Performed by the System and Method As explained above, LRO's side button-bar is always accessible, and includes buttons which open LRO's main windows. The side button-bar also includes the following commonly-used buttons: Undo, Redo, Cut, Copy, Paste, Print, Copy to Floppy Disk, Save, Bold, Italics, Underline, Font, Abbreviations, and Help.

LRO has a top menu bar which is always accessible from any open window, and which includes the following drop-down menus: File (including User Preferences; User Notebook; Print; Printer Setup; Copy to Floppy Disk; Wastebasket; Authorized Setup; and Close); Edit (including Undo; Redo; Cut; Copy; Paste; Abbreviations; Find; Replace; Speller); Font (including Style; Size; Regular; Bold; Italics; Underline; Subscript; Superscript; and Symbols); and Help (including Contents; Index; and About Legal Research Organizer, which contains patent, copyright and license information). The File drop-down menu also shows four project numbers last opened under the user's identification number. By clicking on one of those projects, the user can open the Projects Window with that project as the highlighted entry.

Step 2010: Print/copy to Disk

The Print and Copy to Floppy Disk Buttons can be used to print or copy data from a single window in accordance with a pre-defined format. That feature is not the same as the Transfer Project Data, View/Copy Data, or Propositions and Authorities Report features, explained above.

Step, 2020: Save

LRO automatically saves data when the user closes a window (except when a Cancel Button is pressed), or opens another window. The Save Button enables the user to save data at any time.

Step 2030: Help

The Help Button opens a standard Help Window, through which the user can find an explanation for and tips on each feature of Legal Research Organizer. If the Help Button is pressed when a particular window is open, the Help Window opens with the information relating to that window.

Step 2040: Abbreviations

As indicated above, words used in connection with legal research often must conform to certain abbreviation requirements. The Abbreviations Button enables the user to insert an abbreviation for a word at the cursor in an LRO window, or to automatically convert a highlighted word to the correct abbreviation.

Step 2050: User Preferences

Through LRO's User Preferences Window, the user can pre-set preferences for additional LRO features. Those preferences are tied to the identification number in the User Identification Number and Password Window, and will apply only when LRO is opened via that identification number. The preferences include the following: when the user chooses to delete data, LRO can ask whether the user is sure the data is to be deleted; when the user presses a cancel button after entering/editing data, LRO can ask whether the user wants to save the data; when the user chooses to tie an authority to a project's proposition, and the authority exceeds the scope of research for that proposition, LRO can remind the user of the scope of research.

Step 2060: Authorized Setup

Through LRO's Authorized Setup Windows, the computer or network administrator can view, add, edit and delete user identification numbers and passwords, and set the storage period for data sent to the LRO Wastebasket (described below). The administrator can also view, add, edit and delete certain data that is selected by LRO users from pre-set, read-only lists common to all LRO projects. The pre-set data includes: abbreviations, symbols, and descriptions of jurisdictions, types of authorities, choices of law, research databases, and web sites. The Authorized Setup Windows can be accessed only when the correct authorization number is entered into LRO's Identification Number for Authorized Setup Window, which opens when "Authorized Setup" is selected from the File drop-down menu. The single authorization number is pre-set by the computer or network administrator when installing the LRO program. The data in the Authorized Setup Windows is tied to the LRO program license number, and applies uniformly to all LRO projects tied to that license number. Limited access to the Authorized Setup Windows helps to preserve the uniformity and effectiveness of data entered, organized and analyzed in LRO.

Step 2070: Wastebasket

Through LRO's Wastebasket Window, the user can view deleted data that is stored in the Wastebasket, and the dates that LRO will automatically delete the data from the Wastebasket. The user can choose to have LRO automatically return the data to the appropriate project at any time prior to the storage expiration date. While in the Wastebasket, the description of the data (in the Projects, Project's Propositions or Authorities Windows) is followed by the word "—WASTEBASKET." The Wastebasket storage period is uniformly pre-set for all project data by the computer or network administrator, via the Authorized Setup Window.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A data processing system for organizing, analyzing, recording, storing, tracking, and reporting research results on multiple research projects across multiple users, propositions, authorities, and matters underlying the research projects, while enforcing uniform categories of analysis data across all users, comprising:

(a) a computer having a memory, a central processing unit, and an input/output unit;

(b) a first data structure recorded in said memory, said first data structure encoding a plurality of research projects;

(c) a second data structure recorded in said memory, said second data structure encoding a plurality of propositions, each of said plurality of proposition:

(i) being associated with at least one of said plurality of research projects;

(ii) being adapted to contain at least one word search description associated with each of said plurality of propositions, said word search description further comprising a word search performed by the user;

(iii) being adapted to contain a plurality of database search results associated with said word search, each of said plurality of database search results further comprising a database identifier, the date on which said word search was last performed, and a list of authority citations found by said word search in the database identified by each said database identifier;

(iv) being adapted to contain a listing of proposition data associated with said word search from other of said research projects;

(v) being adapted to contain a plurality of internet search results associated with said word search, each of said plurality of intermit search results further comprising an internet site identifier in hyper-link text, the date on which said word search was last performed, and a list of authority citations found by said word search in each internet site identified by said internet site identifier;

(d) a third data structure recorded in said memory, said third data structure encoding a plurality of authorities, wherein:

(i) each of said plurality of authorities is associated with at least one of said plurality of research projects;

(ii) each of said plurality of authorities is adapted to contain a plurality of citatory service search results associated with said authority resulting from a search of at least one citatory service;

(iii) selected ones of said plurality of authorities are associated with an associated proposition selected from said plurality of propositions; and (iv) each of said plurality of authorities further comprises uniform categories of analysis data, said uniform categories of analysis data comprising; an authority proposition similar or contrary to said associated proposition; authority excerpts relevant to said associated proposition; other authorities cited by said authority which are relevant to said associated proposition; and comments associated with said associated proposition;

(e) a computer program executing in said central processing unit, said computer program defining structural and functional relationships among said plurality of research projects, said plurality of propositions, and said plurality of authorities, said computer program receiving information on said plurality of research projects, said plurality of propositions, and said plurality of authorities from an operator through said input/output unit, and said computer program organizing said information and displaying relationships among said plurality of research projects, said plurality of propositions, said plurality of authorities, and said information to the operator through said input/output unit.

2. The data processing system of claim 1, each of said plurality of research projects further comprising a project name and a project number, said project number being automatically generated by said computer program as said project is input by the operator.

3. The data processing system of claim 1, each of said plurality of propositions further comprising a proposition number and a proposition description.

4. The data processing system of claim 3, each of said plurality of propositions further comprising scope of research data defining the scope of authorities to be researched.

5. The data processing system of claim 4, said scope of research data being selected from the group consisting of: date range, jurisdiction, choice of law, and authority type.

6. The data processing system of claim 3, further comprising at least one key number description associated with each of said proposition descriptions.

7. The data processing system of claim 6, further comprising a plurality of key number search results associated with said key number description, said key number search results being input by the operator after preforming a key number search.

8. The data processing system of claim 7, each of said plurality of key number search results further comprising said key number description, a list of jurisdictions searched, the date on which said key number search was last performed, and a list of authority citations found by said key number search under the key number identified by each key number description.

9. The data processing system of claim 8, each of said authority citations further comprising authority review status data and a date on which said authority review status data was last updated.

10. The data processing system of claim 1, each of said plurality of database search results further comprising a list of jurisdictions searched.

11. The data processing system of claim 10, each of said authority citations further comprising authority review status data and a date on which said authority review status data was last updated.

12. The data processing system of claim 1, wherein each of said plurality of batabase search results may be downloaded into said memory from a CD-ROM through said input/output unit.

13. The data processing system of claim 1, wherein each of said plurality of database search results may be downloaded into said memory from a network connected to said computer.

14. The data processing system of claim 1, each of said propositions associated with said word search further comprising proposition review status data and a date on which said proposition review status data was last updated.

15. The data processing system of claim 1, further comprising word processor document descriptions resulting from searching word processor documents with said word search.

16. The data processing system of claim 15, each of said word processor document descriptions further comprising document review status data and a date on which said document review status data was last updated.

17. The data processing system of claim 1, each of said plurality of internet search results further comprising a list of jurisdictions searched.

18. The data processing system of claim 17, each of said authority citations further comprising authority review status data and a date on which said authority review status data was last updated.

19. The data processing system of claim 1, wherein said internet search results may be downloaded into said memory from a network connected to said computer.

20. The data processing system of claim 1, each of said plurality of authorities further comprising a citation, a date of the authority, an authority type, authority jurisdiction data and authority choice of law data.

21. The data processing system of claim 20, said computer program automatically converting components of said citation to a correct abbreviation.

22. The data processing system of claim 20, wherein text associated with said plurality of authorities may be downloaded into said memory from a CD-ROM through said input/output unit.

23. The data processing system of claim 20, wherein text associated with said plurality of authorities may be downloaded into said memory from a network connected to said computer.

24. The data processing system of claim 1, each of said plurality of citator services search results further comprising citations, authority review status data and a date on which said authority review status data was last updated.

25. The data processing system of claim 1, wherein each of said plurality of citator services search results may be downloaded into said memory from a CD-ROM through said input/output unit.

26. The data processing system of claim 1, wherein each of said plurality of citator services search results may be downloaded into said memory from a network connected to said computer.

27. The data processing system of claim 1, said uniform categories of analysis data further comprising: authority facts relevant to said associated proposition, authority rationale for said authority proposition, project facts similar or contrary to said relevant authority facts, authority persuasion factors, authority quotations relevant to said associated proposition, parenthetical associated with said associated proposition, authority headnotes relevant to said associated proposition, authority key numbers relevant to said associated proposition, authority use indicators associated with said associated proposition and all of said plurality of propositions, comments associated with all of said plurality of propositions, relevant authority pages, and a date on which said category of analysis data item was last edited.

28. The data processing system of claim 27, said authority persuasion factors being selected from the group consisting of: states similar proposition; explains rationale; contains persuasive quotation; involves similar facts; concludes with a favorable result; was issued recently; involved the same judge(s), same/higher court, same jurisdiction, or same choice of law associated with the matter underlying said project; and other persuasion factors input by the operator through said input/output unit, each of said authority persuasion factors having a weight, and said computer program calculating a persuasion factor rank for each of said authorities based on said weights.

29. A The data processing system of claim 27, said authority use indicator being selected from the group consisting of: use authority, maybe use authority, do not use authority, reviewed and skipped, skipped, and not analyzed yet.

30. The data processing system of claim 1, further comprising a plurality of key cite search results associated with said authority and said associated proposition.

31. The data processing system of claim 30, each of said key cite search results including citations and further comprising authority review status data and a date on which said authority review status data was last updated.

32. The data processing system of claim 30, wherein each of said key cite search results may be downloaded into said memory from a CD-ROM through said input/output unit.

33. The data processing system of claim 30, wherein each of said key cite search results may be downloaded into said memory from a network connected to said computer.

34. The data processing system of claim 1, further comprising a fourth data structure recorded in said memory, said fourth data structure encoding a plurality of idea/prose items associated with each of said plurality of projects.

35. The data processing system of claim 34, each of said idea/prose items further comprising an idea/prose item number, a last edited date, and a list of associated propositions.

36. The data processing system of claim 34, further comprising a fifth data structure recorded in said memory, said fifth data structure encoding a plurality of tasks associated with each of said plurality of research projects.

37. The data processing system of claim 36, each of said tasks further comprising a task number, priority number, status of completion data, date status was last updated, and a list of associated propositions.

38. The data processing system of claim 36 further comprising a sixth data structure recorded in said memory, said sixth data structure encoding a user notebook.

39. The data processing system of claim 1, said computer program further comprising a propositions report displayed to the operator through said input/output unit.

40. The data processing system of claim 1, 5, 11, 26, 28, or 30, said propositions report further comprising at least one selected proposition and at least one associated propositions report item related to said selected proposition, said associated propositions report items comprising: tasks related to said selected proposition, ideas/prose items related to said selected proposition, said scope of research data, key numbers, said key number search results, said word search descriptions, said database search results, said listing of propositions, said word processor document descriptions, said internet search results, authorities associated with said selected proposition, analysis data from said uniform categories of analysis data, said citator services search results, and said key cite search results.

41. The data processing system of claim 21 or 39, said propositions report farther comprising at least one selected proposition and authorities associated with said selected proposition, wherein said authorities associated with said selected proposition are selected and sorted according to said authority use indicator.

42. The data processing system of claim 20 or 39, said propositions report further comprising at least one selected proposition and authorities associated with said selected proposition, wherein said authorities associated with said selected proposition are selected and sorted according to said authority type.

43. The data processing system of claim 20, 28 or 39, said propositions report further comprising at least one selected proposition and authorities associated with said selected proposition, wherein said authorities associated with said selected proposition are selected and sorted alphabetically, chronologically, reverse chronologically, or by said persuasion factor rank.

44. The data processing system of claim 1, said computer program further comprising an authorities report displayed to the operator through said input/output unit.

45. The data processing system of claim 1, 5, 21, 30 or 44, said authorities report further comprising at least one selected authority and at least one associated authorities report item comprising: said authority choice of law data, said citator services search results, said associated propositions, analysis data from said uniform categories of analysis data and said key cite search results.

46. The data processing system of claim 29 or 44, said authorities report further comprising at least one selected authority and wherein said selected authorities are selected and sorted according to said authority use indicator.

47. The data processing system of claim 20 or 44, said authorities report further comprising at least one selected authority and wherein said selected authorities are selected and sorted according to said authority type.

48. The data processing system of claim 20, 22 or 44, said authorities report further comprising at least one selected authority And wherein said selected authorities are selected and sorted alphabetically chronologically, reverse chronologically, or by said persuasion factor rank.

49. The data processing system of claim 1, further comprising a plurality of user identification numbers recorded in said memory.

50. The data processing system of claim 49, further comprising a set of user preferences associated with each of said user identification numbers.

51. The data processing system of claim 49, further comprising authorized setup capability associated with at least one of said plurality of user identification numbers.

52. The data processing system of claim 4 or 43, said user preferences further comprising a reminder message generated by said computer program if one of said plurality of authorities has a scope differing from said scope of research data.

53. The data processing system of claim 1, said computer program enabling the operator, through said input/output unit, to add, edit, delete, undelete, view, copy, cut, paste, transfer, and print data associated with said plurality of projects, said plurality of propositions, and said plurality of authorities.

54. The data processing system of claim 1, said computer program enabling the operator, through said input/output unit, to view activities that have been performed in connection with each of said plurality of projects.

55. A data processing method for organizing, analyzing, recording, storing, tracking, and reporting research results on multiple research projects across multiple users, propositions, authorities, and matters underlying the research projects, comprising for each user the steps of:

(a) inputting user identification data;

(b) inputting information related to a plurality of research projects;

(c) inputting information related to a plurality of propositions, further comprising the steps of;

(i) associating each of each plurality of propositions with at least one of said plurality of research projects;

(ii) inputting at least one word search description for each of said plurality of propositions;

(iii) performing a word search based on said word search description in at least one database, inputting search results from said word search, and associating said search results with said propositions;

(iv) performing said word search on proposition data associated with said plurality of research projects, inputting search results from said word search, and associating said search results with said associated propositions;

(v) performing said word search in at least one internet site, inputting search results from said word search, and associating said word search results with said proposition;

(d) inputting information related to a plurality of authorities, further comprising the steps of;

(i) associating each of said plurality of authorities with at least one of said plurality of legal research projects;

(ii) associating selected ones of said plurality of authorities with an associated proposition selected from said plurality of propositions;

(iii) inputting citator service data for each of said plurality of authorities, performing a search in at least one citator service, inputting search results from said search, and associating said search results with one of said plurality of authorities;

(iv) inputting uniform categories of analysis data, comprising: an authority proposition similar or contrary to said associated proposition; authority excerpts relevant to said associated proposition; other authorities cited by said authority which are relevant to said associated proposition; and comments associated with said associated proposition;

(e) outputting a propositions report displaying information associated with selected ones of said plurality of propositions; and (f) outputting an authorities report displaying information associated with selected ones of said plurality of authorities.

56. The data processing method of claim 55, wherein said step of inputting information on said plurality of propositions further comprises a step of inputting scope of research data defining the scope of authorities to be researched for each of said plurality of propositions.

57. The data processing method of claim 55, wherein said step of inputting information on said plurality of propositions further comprises a step of inputting key number data including at least one key number for each of said plurality of propositions.

58. The data processing method of claim 57, wherein said step of inputting key number data further comprises the steps of performing a key number search under said key number, inputting key number search results from said key number search, and associating said key number search results with one of said plurality of propositions.

59. The data processing method of claim 58, wherein said step of inputting key number search results further comprises the steps of reviewing authority citations in said key number search results and associating review status data with each of said authority citations.

60. The data processing method of claim 55, wherein said step of performing a word search further comprises the step of reviewing authority citations in said database search results and associating review status data with each of said authority.

61. The data processing method of claim 55, wherein said step of inputting proposition word search results further comprises the step of reviewing data of propositions in said proposition word search results and associating review status data with each of said propositions.

62. The data processing method of claim 55, wherein said step of inputting a word search description further comprises the steps of performing a word processor document word search, inputting word processor document descriptions resulting from said word processor document word search, and associating said word processor document descriptions with one of said propositions.

63. The data processing method of claim 62, wherein said step of inputting word processor document descriptions further comprises the steps of reviewing word processor documents in said word processor descriptions and associating review status data with each of said word processor documents.

64. The data processing method of claim 55, wherein said step of performing an internet word search further comprises the step of reviewing authority citations in said internet word search results and associating review status data with each of said authority citations.

65. The data processing method of claim 55, wherein said step of inputting information on said plurality of authorities further comprises the step of inputting a citation, authority date, authority jurisdiction data, authority type, and authority choice of law data for each of said plurality of authorities.

66. The data processing method of claim 65, said propositions report further comprising at least one selected proposition and authorities associated with said selected proposition and wherein said authorities associated with said selected proposition are selected and sorted according to said authority type.

67. The data processing method of claim 65, said authorities report further comprising at least one selected authority and wherein said selected authorities are selected and sorted according to said authority type.

68. The data processing method of claim 55, wherein said step of inputting information on said plurality of authorities further comprises the step of inputting uniform categories of analysis data comprising: authority relevant facts, authority rationale for said associated proposition, authority facts relevant to said associated proposition, project facts similar or contrary to said authority relevant facts, authority persuasion factors associated with said associated proposition, authority quotations relevant to said associated proposition, parentheticals associated with said associated proposition, authority headnotes relevant to said associated proposition, authority key numbers associated with said associated proposition, authority use indicators associated with said associated proposition and with all of said plurality of propositions, comments associated with all of said plurality of propositions, relevant authority pages, and a date on which said associated authority data item was last edited.

69. The data processing method of claim 68, said authority use indicator comprising: use authority, maybe use authority, do not use authority, reviewed and skipped, skipped and not analyzed yet.

70. The data processing method of claim 69, said propositions report further comprising at least one selected propositions and authorities associated with said selected proposition and wherein said authorities associated with said selected proposition are selected and sorted according to said authority use indicator.

71. The data processing method of claim 69, said authorities report further comprising at least one selected authority and wherein said selected authorities are selected and sorted according to said authority use indicator.

72. The data processing method of claim 68, said authority persuasion factors comprising: states similar proposition; explains rationale; contains persuasive quotation; involves similar facts; concludes with a favorable result; was issued recently; involved the same judge(s), same/higher court, same jurisdiction, or same choice of law associated with the matter underlying said project; and other persuasion factors input by the operator, each of said authority persuasion factors having a weight, and said computer program calculating a persuasion factor rank for each of said authorities based on said weights.

73. The data processing method of claim 55, wherein said step of inputting information on said plurality of authorities further comprises the step of inputting key cite citatory service data for each of said plurality of authorities.

74. The data processing method of claim 73, wherein said step of inputting key cite citator service data further comprises the steps of performing a key cite search in the key cite citator service, inputting key cite search results from said key cite search, and associating said key cite search results with one of said authorities and said associated proposition.

75. The data processing method of claim 74, wherein said step of inputting key cite search results further comprises the step of reviewing authority citations in said key cite search results and associating review status data with each of said authority citations.

76. The data processing method of claim 55, further comprising the step of inputting ideas, prose, and related data associated with each of said plurality of legal research projects.

77. The data processing method of claim 55, further comprising the step of inputting a list of tasks and related data associated with each of said plurality of legal research projects.

78. The data processing method of claim 55, 58, 62, 68, 74, 76, or 77, said propositions report further comprising at least one selected proposition and at least one associated propositions report item related to said selected proposition, said associated propositions report item being selected from the group consisting of tasks related to said selected proposition, ideas/prose items related to said selected proposition, said scope of research data, key numbers, said key number search results, said word search descriptions, said database search results, said proposition word search results, said word processor document descriptions, said internet search results, authorities associated with said selected proposition, analysis data from said uniform categories of analysis data, said citator services search results, and said key cite search results.

79. The data processing method of claim 65, or 72, said propositions report further comprising at least one selected proposition and authorities associated with said selected proposition and wherein said authorities associated with said selected proposition are selected and sorted alphabetically, chronologically, reverse chronologically, or by said persuasion factor rank.

80. The data processing method of claim 65, 68, or 74, said authorities report further comprising: said authority choice of law data, said citator services search results, said associated propositions, analysis data from said uniform categories of analysis data sand said key cite search results.

81. The data processing method of claims 65, or 72, said authorities report further comprising at least one selected authority and wherein said selected authorities are selected and sorted alphabetically, chronologically, reverse chronologically, or by said persuasion factor rank.

82. The data processing method of claim 55, further comprising the step of inputting general notes for each user in a user notebook.

* * * * *